US009326145B2

(12) United States Patent
Awan et al.

(10) Patent No.: US 9,326,145 B2
(45) Date of Patent: Apr. 26, 2016

(54) SYSTEM AND METHOD FOR APPLICATION USAGE CONTROLS THROUGH POLICY ENFORCEMENT

(71) Applicant: Aruba Networks, Inc., Sunnyvale, CA (US)

(72) Inventors: Asif Awan, Dublin, CA (US); Shekhar Kshirsagar, San Jose, CA (US); Chetan Kumar, Bangalore (IN); Deepak Agarwal, Bangalore (IN); Suman Maradani, Bangalore (IN); Sunil G. V. Babu, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 80 days.

(21) Appl. No.: 13/971,759

(22) Filed: Aug. 20, 2013

(65) Prior Publication Data
US 2014/0173700 A1    Jun. 19, 2014

Related U.S. Application Data

(60) Provisional application No. 61/737,819, filed on Dec. 16, 2012, provisional application No. 61/776,633, filed on Mar. 11, 2013.

(51) Int. Cl.
H04W 12/08    (2009.01)
H04L 29/06    (2006.01)
H04W 12/02    (2009.01)

(52) U.S. Cl.
CPC .............. *H04W 12/08* (2013.01); *H04L 63/107* (2013.01); *H04L 63/20* (2013.01); *H04W 12/02* (2013.01)

(58) Field of Classification Search
CPC ...... H04W 12/08; H04W 12/02; H04L 67/04; H04L 63/107; H04L 63/20; H04L 63/10
USPC ........................................ 726/4, 22; 713/186
See application file for complete search history.

(56) References Cited

U.S. PATENT DOCUMENTS

| 2007/0101435 | A1* | 5/2007 | Konanka | G06F 21/52 726/27 |
| 2008/0004886 | A1* | 1/2008 | Hames et al. | 705/1 |
| 2009/0172821 | A1* | 7/2009 | Daira | G06F 21/55 726/27 |
| 2013/0219462 | A1* | 8/2013 | Aratsu | G06F 21/10 726/1 |
| 2014/0033326 | A1* | 1/2014 | Chien | 726/28 |

* cited by examiner

Primary Examiner — Dao Ho
(74) Attorney, Agent, or Firm — Mannava & Kang, P.C.

(57) ABSTRACT

A method includes a particular user application, without operating system kernel access, performing the operations of: identifying a set of applications that a user has permission to access, receiving a request to a access a particular application of the set of applications, and causing execution of the particular application.

17 Claims, 36 Drawing Sheets

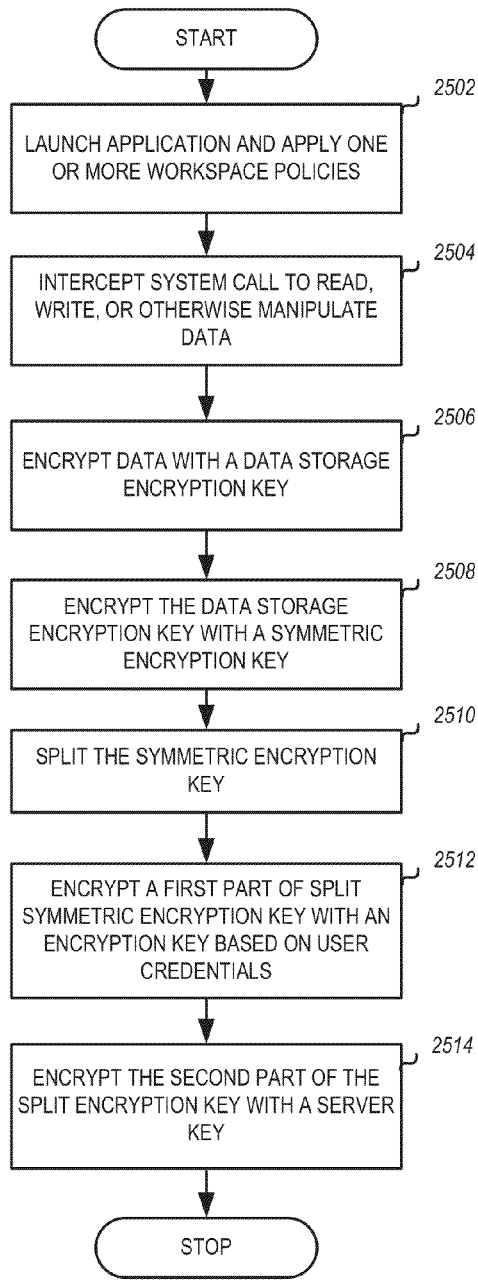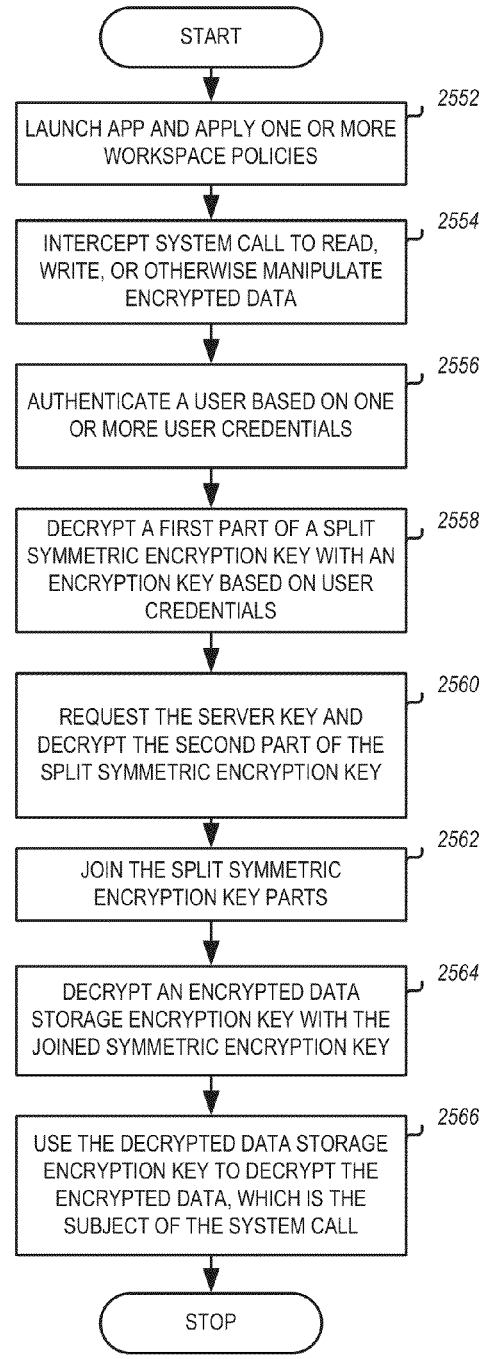
FIG. 25A
FIG. 25B

SYSTEM AND METHOD FOR APPLICATION USAGE CONTROLS THROUGH POLICY ENFORCEMENT

BENEFIT CLAIM; INCORPORATION BY REFERENCE

This non-provisional patent application claims priority under 35 U.S.C. §120 to provisional patent application 61/776,633 filed on Mar. 11, 2013, the entire contents of which are hereby incorporated by reference.

FIELD

Embodiments of the present disclosure relate to the field of network communications, and in particular a system and method for controlling application software operating within a sandbox environment through policy enforcement.

BACKGROUND

Until fairly recently, wireless networks were configured to only support wireless devices that were pre-approved by a network administrator. Typically, this required an incoming guest to register her wireless device (e.g., dual-mode cellular telephone with capabilities) with the network administrator. This registration process was problematic because, from an IT perspective, it was quite labor intensive and there is little control on the types of applications that could be executed by that registered wireless device.

Namely, for device registration, the network administrator manually uploaded either the unique media access control (MAC) address of the wireless device or its newly assigned identifier into a database. Tasked with the responsibility of controlling access to the wireless network, an authentication server accessed the database whenever a wireless device sought access to the network. If the wireless device was registered, it was granted access to the network. Otherwise, access was denied. The types of applications executed by the wireless device were not controlled thoroughly.

Recently, wireless networks are being adapted to support "Bring-Your-Own-Device" (BYOD) environments, where all users are able to access a targeted wireless network through their personal devices, such as laptop computers, tablets, or dual-mode cellular telephones for example. As a result, the number of devices per network user has grown from a one-to-one relationship to a one-to-many relationship as a network user may simultaneously or interchangeably connect to a network using multiple devices.

In light of BYOD environments, controlling enterprise access to personal devices and enforcing compliance with access and usage policies for application software running on these devices has become imperative for network security. Without such policy enforcement, users may install and operate application software as well as access websites that are inappropriate for a work environment. Furthermore, without ensuring compliance with application software usage, the BYOD networking environment has made networks susceptible to malware attacks.

Therefore, a system and method is needed for enabling application software to be provisioned within an enterprise network along with device-level policy enforcement to control access and usage of the application software, especially application software provided by third parties.

BRIEF DESCRIPTION OF THE DRAWINGS

Embodiments of the present disclosure are illustrated by way of example, and not by way of limitation, in the figures of the accompanying drawings and in which:

FIGS. 25A-25B are exemplary flow diagrams of the operations for enabling a split key-based encryption technique for securing workspace and wrapped application data.

DETAILED DESCRIPTION

Figure 1:
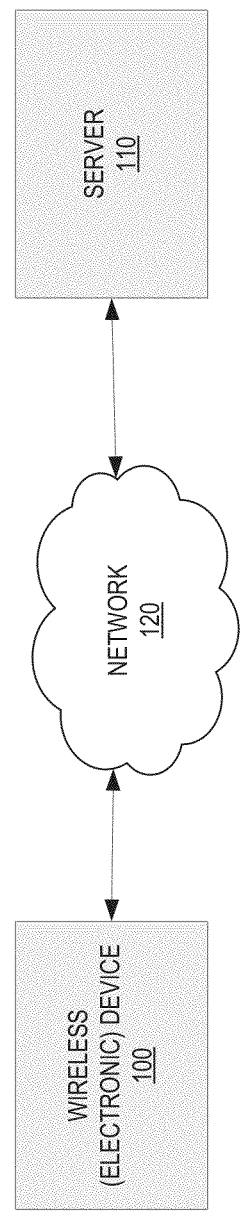
FIG. 1 is a general block diagram of a network including a first networked electronic device (wireless device) and a second networked electronic device (server) collectively deploying policy enforcement for controlling access and usage of application software.

Various embodiments of the disclosure relate to a system and method for managing a logical environment, referred to as a "workspace," which provides a user of a wireless device with the perception that, through policy compliance and a controlled graphic user interface (GUI), she is operating within a controlled enterprise boundary. Within a particular workspace, one or more sandboxed applications may be configured to seamlessly communicate with each other through pre-defined security policies. These applications may include a workspace application and one or more "wrapped" applications.

A "workspace application" is an application that manages a particular workspace and produces a springboard, dashboard or other type of display screen to illustrate all applications associated with that particular workspace. These applications may include one or more "wrapped" application(s) and/or "unwrapped" application(s). The workspace application and other wrapped applications belonging to the particular workspace may be automatically provisioned from a remotely located source (e.g. a server) without the user conducting any manual or explicit downloads or installations.

As described below in detail, an application is considered to be "wrapped" when the application undergoes binary instrumentation, namely a process of adding new functionality to (or modifying existing functionality of) a binary executable application and/or any accompanying binary non-executable information (e.g., configuration file, resource file, etc.). Binary instrumentation may be accomplished by inserting logic adapted to intercept low-level platform calls and change the behavior of those calls into the executable application. Herein, this intercepting logic is referred to as a "policy enforcer."

Binary instrumentation normally is used when either the source code of the executable application is not available or the same set of software changes needs to be applied in an automated way to different executable applications. Through binary instrumentation, otherwise referred to as "wrapping," sandboxed wrapped applications, which are running on the wireless device and managed in accordance with pre-defined security policies, may be provided with certain functionality and/or capabilities. The functionality and/or capabilities may include, but are not limited to, the following: (1) inter-application communications with virtualization; (2) workspace auto-provisioning and de-provisioning; (3) application auto-provisioning and de-provisioning based on selected factors (geographic, date/time, etc.); (4) dynamic configuration updates of security policies; (5) multi-user workspace virtualization; (6) application notification; (7) cross-platform application aliasing; (8) data access controls; and (9) automatic cloud-based storage and backup. This functionality is described below in detail.

Herein, certain terminology is used to describe features for embodiments of the disclosure. For example, the term "wireless device" generally refers to any electronic device that includes logic adapted to wirelessly communicate with a network and/or process information related to such communications. Different types of wireless devices may include, but are not limited or restricted to a tablet; laptop; netbook; portable television; video gaming controller; mobile device with cellular and/or wireless connectivity such as a smartphone, personal digital assistant "PDA", headset, wearable networked accessory (e.g. glasses, watches, etc.), or the like.

It is contemplated that a wireless device may include hardware logic, including one or more of the following: (i) processing circuitry; (ii) one or more communication interfaces such as radios (e.g., one or more components that handle the wireless data transmission/reception) and/or physical connectors to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Additionally, the terms "logic" and "engine" are generally defined as hardware and/or software. As hardware, logic may include processing circuitry (e.g., a controller, a processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "application" is application software generally defined as a collection of binary information, including at least a binary executable application. Additionally, the application may further comprise one or more non-executable files such as a configuration file and/or resource file as described below.

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes any grouping of data in the form of a packet, a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the invention, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

I. General Network Architecture

Referring to FIG. 1, a general block diagram of a first networked electronic device 100 (e.g. wireless device) and a second networked electronic device 110 (e.g. server) communicatively coupled via a network 120 is shown. Collectively, wireless device 100 and server 110 support policy enforcement in controlling access and usage of application software. According to this embodiment of the disclosure, network 120 is a local area network (LAN) operating in accordance with any current or upcoming Institute of Electrical and Electronic Engineers (IEEE) 802.11 standards (e.g., IEEE 802.11a/ac/b/g/n). However, it is contemplated that network 120 may support any of a number of other wireless communication protocols including HiperLan/1, HiperLan/2, or the like.

As illustrated, the infrastructure of network 120 is a collection of electronic devices that is adapted to support communications between wireless device 100 and server 110. The selection of electronic devices formulating the network infrastructure may vary, depending on the selected network architecture.

For instance, although not shown in detail, where network 120 is a wireless local area network (WLAN), the infrastructure of network 120 may comprise an access point (AP) communicatively coupled to a controller. Herein, the AP is configured to establish communications with wireless electronic devices within its coverage area such as wireless device 100 for example. The controller is configured to monitor messages received by the AP from different networked electronic devices, including wireless device 100, and route particular messages to server 110. As a result, server 110 may be adapted to provide a user-specific workspace through the management of applications (e.g. workspace application(s), wrapped applications, etc.) as well as policies associated with the particular user.

Alternatively, where network 120 is a local area network (LAN) supporting wired connectivity, the infrastructure may comprise one or more data transfer devices, such as manageable switch (e.g. 802.1X switch) and router. This network infrastructure equipment supports communications between wireless device 100, which also features a communication port that supports wired connectivity, and server 110.

Referring still to FIG. 1, after a communication path has been established with wireless device 100 and server 110, it is contemplated that server 110 (or logic operating in concert with server 110) may perform device fingerprinting. "Device fingerprinting" involves the monitoring of initial messages transmitted by wireless device 100 to determine whether this electronic device is registered to operate on network 120.

Figure 2:
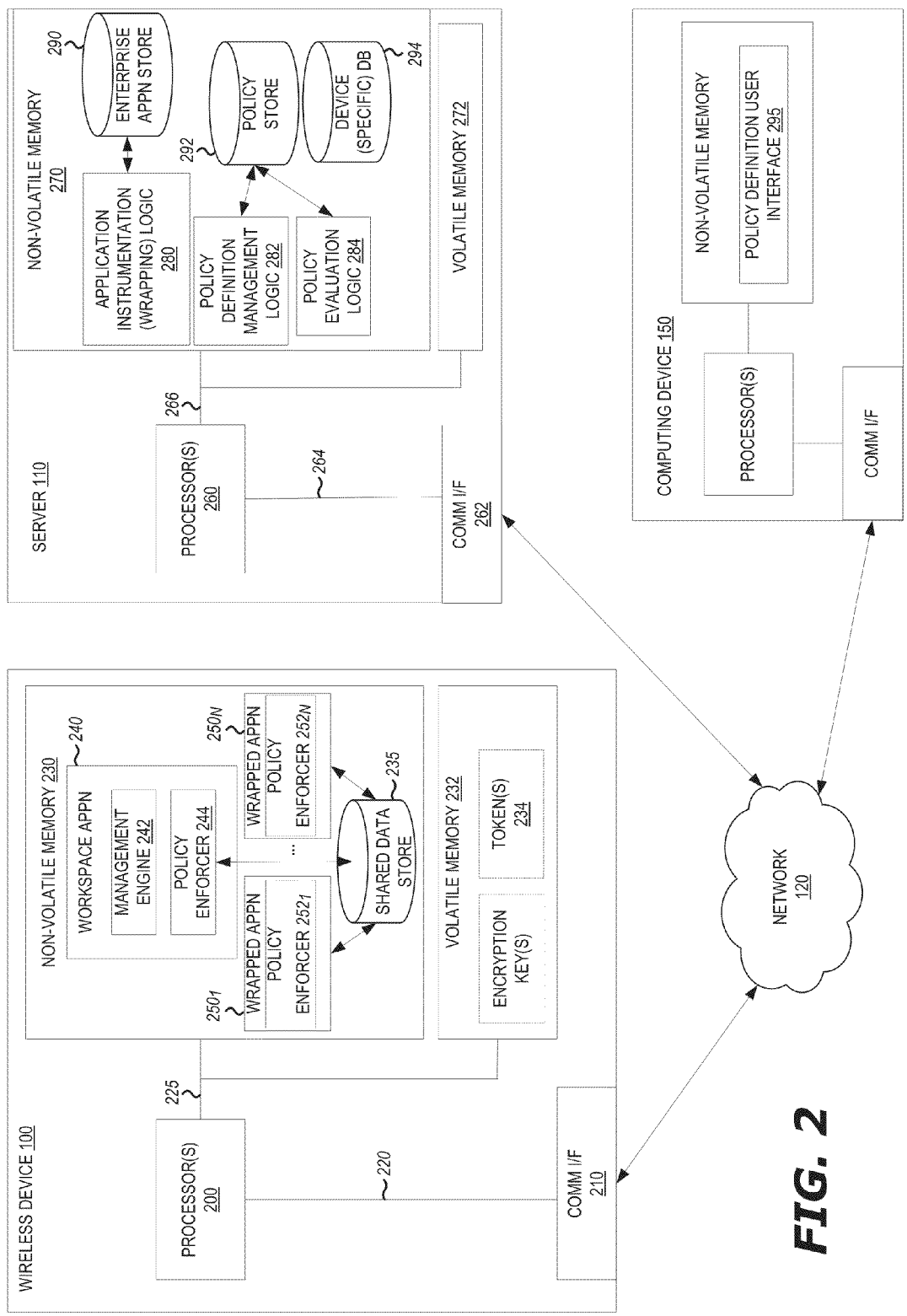
FIG. 2 is an exemplary detailed block diagram of the internal logic within the networked electronic devices within the wireless network of FIG. 1.

One type of "device fingerprinting" involves analysis of contents within a Dynamic Host Configuration Protocol (DHCP) Options field of a DHCP Discovery message. Wireless device 100 would broadcast a DHCP Discovery message in efforts to obtain an Internet Protocol (IP) address for use on network 120. In many cases, the content within the DHCP Options field suggests capabilities (e.g., information directed to functionality of the device such as operating system used, authentication protocol(s) supported, etc.) and/or type of device (e.g., information to identify the device such as manufacturer name, product name, etc.), which may assist server 110 to determine whether wireless device 100 should be permitted to operate on network 120 as well as what workspace, wrapped applications and policies should be provisioned. Herein, the device capabilities and/or device type information, which are explicitly identified or inferred, may be generally referred to as "device characteristics". The device characteristics may be stored in device specific database 294 as shown in FIG. 2.

More specifically, if server 110 is unable to recognize an identity of wireless device 110 as the device characteristics is not identifiable, wireless device 110 may be placed into a guest provisioned role, which restricts its access to network resources. In some cases, it may prohibit access to network resources.

Another type of "device fingerprinting" may involve server gaining access to a media access control (MAC) address of wireless device 100. This may be accomplished by extracting the source MAC address from signaling originating from wireless device 100. The MAC address of wireless device 100 is compared to stored MAC addresses for devices that have been previously been registered. If the MAC address of wireless device 100 fails to match any of the stored MAC addresses, server 110 provisions wireless device 100 as a guest in which the workspace and wrapped applications may be quite limited and not customized for that particular wireless device.

It is contemplated that the stored MAC addresses for previously registered wireless devices may be contained within a MAC table, which is updated at a periodicity selected by the network administrator. Hence, if there is no activity from one of the wireless devices for a predetermined period of time, the MAC address of that device is removed from the MAC table. This may avoid legacy electronic devices from nefariously gaining access to network 120 from outside the building.

Yet another type of "device fingerprinting" may involve server 110 comparing a username provided during an initial message exchange between wireless device 100 and server 110. The username provided by wireless device 100 may be compared to active usernames that are used by previously authenticated wireless devices and stored within network infrastructure 120 and/or server 110 (or an authentication system communicatively coupled with server 110).

Referring now to FIG. 2, an exemplary detailed block diagram of the internal logic within networked devices, such as wireless device 100 and server 110 communicatively coupled via network 120 is shown. As shown, wireless device 100 comprises one or more processors 200 that are coupled to communication interface logic 210 via a first interconnect 220. Communication interface logic 210 enables communications with other electronic devices, such as server 110 over private and/or public networks. According to one embodiment of the disclosure, communication interface logic 210 may be implemented as one or more radio units (e.g. transmitter logic, receiver logic and/or transceiver logic,) for supporting wireless communications with other electronic devices. In the alternative, or additionally, communication interface logic 210 may be implemented as a physical connector including one or more ports for wired connectors.

Processor(s) 200 is further coupled to non-volatile memory 230 and/or volatile memory 232 via a second interconnect 225. According to one embodiment of the disclosure, non-volatile memory 230 may include a shared data store 235 as well as a workspace application 240 and one or more wrapped applications $250_1$-$250_N$ (where N≥1), where the applications are run in a sandbox environment. As discussed herein, the sandbox environment is a limited and tightly controlled execution environment provided by a software operating system (not shown) executed on wireless device 100 by processors(s) 200. In the sandbox environment, each application (e.g., workspace application, wrapped applications, and unwrapped applications) is "sandboxed" (i.e., executed) in the user environment with its own set of resources, and without access to a kernel, as well as other resources provided by, the software operating system of wireless device 100.

Workspace application 240 comprises a management engine 242 and a policy enforcer 244. Management engine 242 is logic that is adapted to generate and control a particular workspace associated with the user, where the workspace may be represented by a springboard, dashboard or other type of display screen (see FIG. 7 for example) that illustrates icons associated with wrapped applications $250_1$-$250_N$. Workspace application 240 may be automatically provisioned from server 110 after digital fingerprinting of wireless device 100. Certain management functionality of workspace application 240 is described below.

It is noted that a list of "unwrapped" applications, namely applications that have not undergone binary instrumentation to enable control through administrator-defined security policies, may be downloaded to workspace application 240 as part of the configuration payload. Management engine 242 controls display of the list of unwrapped applications on the workspace springboard as "recommended applications" for the user to download from one or more sources (e.g., Google® Play® store, Apple® App Store™, Amazon® Appstore, Windows® Phone store or BlackBerry® World™ app store, or combinations of such public application stores). So, when the user selects one of the icons or listed application names presented on the workspace springboard, the user is prompted to download and install the application from that source.

According to one embodiment of the disclosure, policy enforcer 244 is code added as part of workspace application 240, normally by placement within a first library of a dynamic load library, which is part of the binary executable application of workspace application 240. Policy enforcer 244 is adapted to intercept certain system and framework (e.g. application programming interface "API"-based) function calls from workspace application 240 and alter these function calls to enforce policies applied to the workspace. Such policies may be uploaded from a policy store 292 within server 110 upon connecting to network 120.

These policies are subsequently stored within shared data store 235, where such policies are accessible by policy enforcer 244 within workspace application 240 as well as policy enforcers $252_1$-$252_N$ within wrapped applications $250_1$-$250_N$. The policies within shared data store 235 are periodically updated by one of policy enforcers 244, $252_1$, . . . or $252_N$ that establish communications with server 110 to download current policies from policy store 292.

Wrapped applications $250_1$-$250_N$ are software applications that, when launched, are directed to perform intended operations, provided such operations do not violate any policies maintained by policy enforcers $252_1$-$252_N$, respectively. Similar to discussions above, each policy enforcer $252_1$, . . . , or $252_N$ is code injected during binary instrumentation at server 110 to be an integral part of wrapped applications $250_1$-$250_N$. For instance, by placement of policy enforcer $252_i$ (1≤i≤N) within wrapped application $250_i$, namely as a first library of a dynamic load library being part of the binary executable application of wrapped application $250_i$, policy enforcer $252_i$ is adapted to enforce policies pushed by server 110 on actions and events conducted by wrapped application $250_i$, normally through system or framework function calls interception and alteration. Herein, the policies may be user-based (e.g. privileges, permissions, etc.) or may be directed to factors associated with wireless device 100 such as geo-fencing, time-fencing, motion-fencing, network-fencing, device connectivity, device-state, or the like. These policies, which may be identical to or different than the policies associated with workspace application 240, are also uploaded from policy store 292 within server 110 to shared data store 235.

The specifics of the binary instrumentation, otherwise referred to as the wrapping process, are described below and illustrated in FIGS. 3A-3C.

Referring still to FIG. 2, server 110 comprises one or more processors 260 that are coupled to communication interface logic 262 via a first interconnect 264. Communication interface logic 262 enables communications with other electronic devices, such as wireless device 100 over private and/or public network. According to one embodiment of the disclosure, communication interface logic 262 is normally implemented with one or more ports for wired connectors, although wireless connectivity may be supported.

Similar to wireless device 100, processor(s) 260 is further coupled to non-volatile memory 270 and/or volatile memory 272 via a second interconnect 266. According to one embodiment of the disclosure, non-volatile memory 270 may include application instrumentation logic 280, policy definition management logic 282, policy evaluation logic 284, enterprise application store 290, policy store 292 and a device specific database 294.

Application instrumentation logic 280 is adapted to perform binary instrumentation (wrapping) operations on an uploaded application, which includes the binary executable application as well as accompanying binary non-executable files such as configuration files (sometimes referred to as "property list files") and/or resource files. The resultant wrapped application is subsequently stored in enterprise application store 290 and later accessed for downloading to wireless device 100.

As an illustrative example, the configuration file accompanying the executable application may include an information property list "information.plist" for one type of wireless device 100 (e.g. Apple® iPhone®) and an Android® Manifest file "AndroidManifest.xml" for another type of wireless device 100 (e.g. Android®-based phone). Each of these configuration files may include a unique identity for the wrapped application, one or more Uniform Resource Locators (URLs) that the wrapped application supports, document type(s) that the wrapped application supports, operations that require certain privileges or permissions, etc.

Resource files may contain all the internationalization and localization information for the wrapped application. This information enables the wrapped application to be adapted to various languages and regions without substantial coding changes along with text translation.

Policy definition management logic 282 is adapted to receive one or more security policies uploaded from a computing (electronic) device 150, such as a computer utilized by a network administrator. Computing device 150 is loaded with policy definition user interface logic 295 that enables the network administrator to create security policies to be observed by networked electronic devices such as wireless device 100. These security policies are uploaded to policy definition management logic 282, which stores such security policies within policy store 292 for later distribution.

Policy evaluation logic 284 conducts policy evaluation, based on information provided by wireless device 100 to determine compliance with certain policies before an event occurs. For instance, policy evaluation logic 284 may be used to determine, based on information received from wireless device 100 and analysis with policies stored on policy store 292, whether geo-fencing or time-fencing policies have been complied with before a certain wrapped application is provisioned to (or de-provisioned from) wireless device 100.

Device specific database 294 is adapted to store information about each registered electronic device, including wireless device 100, that are configured to make calls to server 110. Such information may include an indication of the registered electronic device is jailbroken or not; media access control (MAC) address; OS type; OS version; hardware specifics; and/or cryptographic protocol supported.

II. Operational Flows of Functions Utilized and Supported by the Wireless Device and the Server A. Binary Instrumentation One of the purposes of binary instrumentation (wrapping) is to enable sandboxed applications 240 and $250_1$-$250_N$ of FIG. 2, which are running on wireless device 100, to seamlessly communicate with each other through pre-defined security policies. Hence, wrapping of an application provides a mechanism to control certain application behaviors in accordance with selected security policies.

Figure 3A:
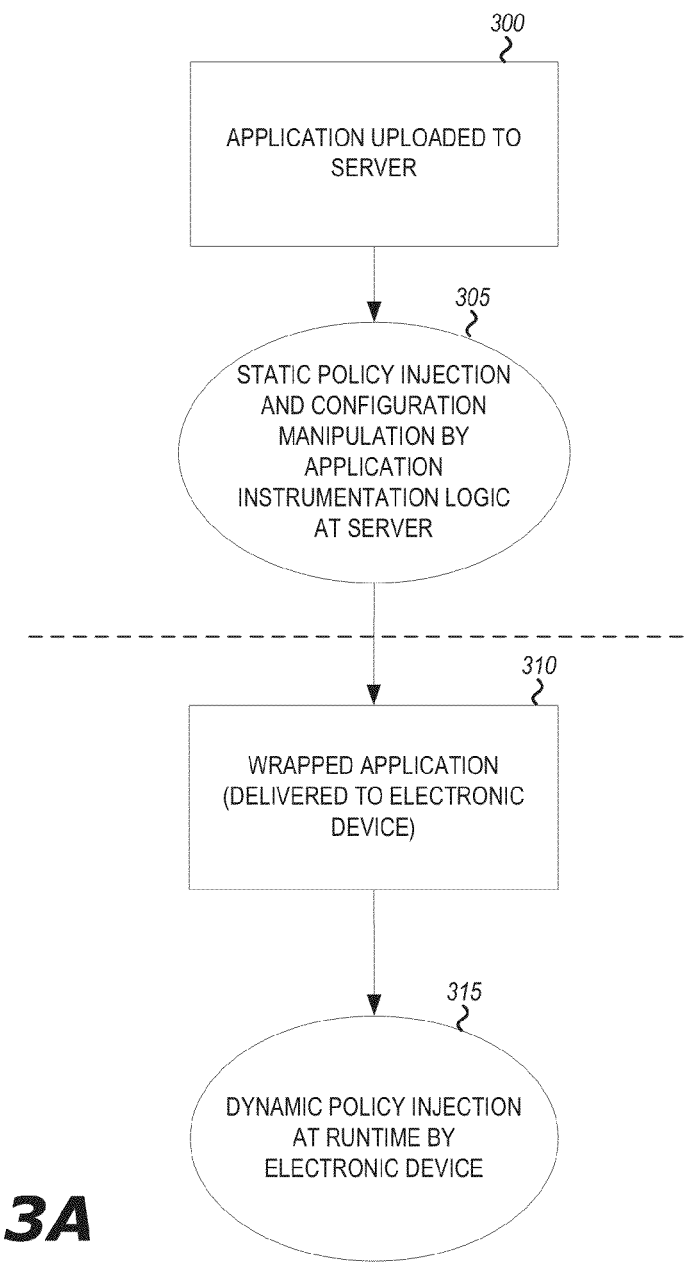
FIGS. 3A-3C are exemplary flow diagrams of the operations performed by application instrumentation wrapping logic and a policy enforcer implemented within a wrapped application within the second networked electronic device of FIG. 2.
Figure 3B:
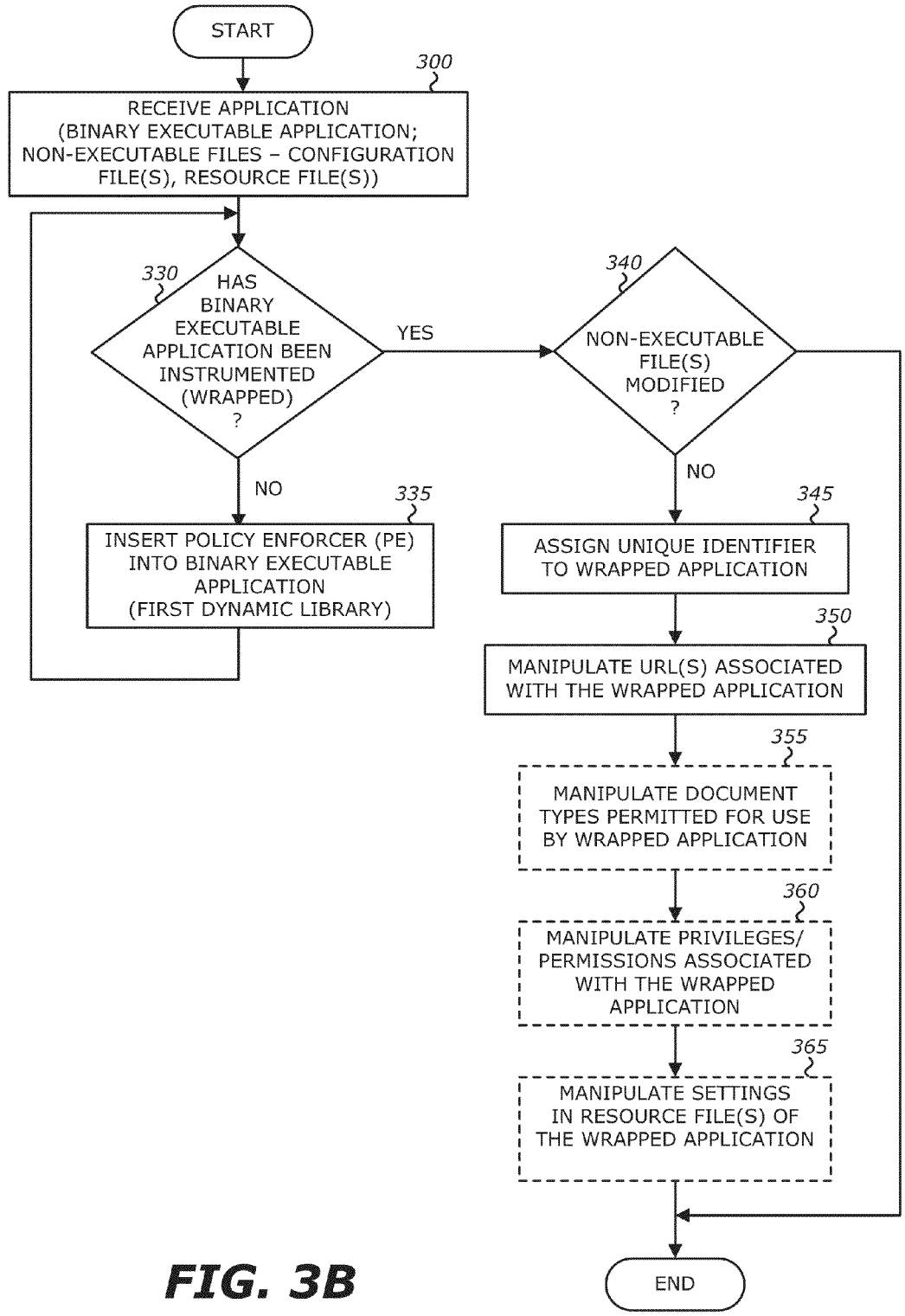
Figure 3C:
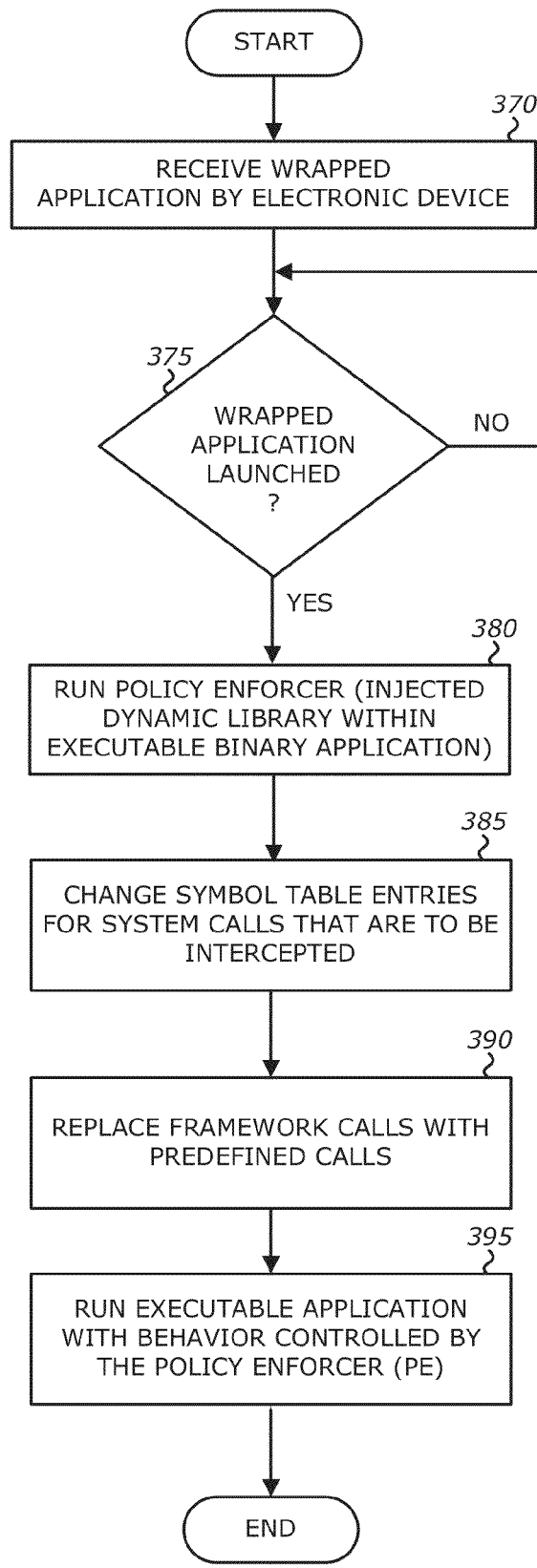

Referring now to FIGS. 3A-3C, exemplary flow diagrams of operations for binary instrumentation (wrapping) of an application, where at least the behavior of the binary executable application is modified in accordance to selected security policies. As shown, binary instrumentation involves static policy injection and dynamic policy injection.

As shown in FIG. 3A, upon receipt of an application, the application instrumentation logic within the server adds additional code (referred to as a "policy enforcer"), which includes an additional dynamic library to the binary executable for example (blocks 300 and 305). The policy enforcer is configured to intercept and modify certain framework (e.g., object-oriented code such as "Objective-C") and system (e.g. machine code such as "Native C") calls, at run-time, to enforce security policies provided by the server. Besides insertion of the policy enforcer within the binary executable application, operations are performed on the non-executable files (e.g. configuration and/or resource files) associated with the application as describe in FIG. 3B.

1. Static Policy Injection

Referring now to FIG. 3B, an illustrative embodiment of the static wrapping operations performed by application instrumentation logic 280 of FIG. 2 is shown. Initially, after receipt of an (unwrapped) application, a determination is made whether the binary executable application has been wrapped (blocks 300 and 330). If not, the policy enforcer (e.g. policy enforcer $252_1$), being code that intercepts and/or modifies framework and system calls, is inserted into the binary executable of the application to produce a wrapped application such as wrapped application $250_1$ of FIG. 2 for example (block 335). According to this embodiment of the disclosure, the policy enforcer is implemented as the first library of the dynamic load library. After the binary executable has been wrapped, a determination is made as to whether there are any non-executable files to be modified (block 340).

As part of the wrapping process, each wrapped application (inclusive of the binary executable and the non-executable files) is assigned a unique identifier (block 345). According to one embodiment of the disclosure, this identifier may include the name of the workspace of which the application undergoing the wrapping operation is to be a member.

Additionally, since each wrapped application is launched by use of its URL, during the wrapping process, each URL associated with a particular application undergoing the wrapping operation is altered (block 350). For instance, according to one embodiment of the disclosure, the URL for the particular application undergoing the wrapping operation is modified to include the unique identifier assigned to the wrapped application. Additionally, new URLs may be added to the configuration files of the wrapped application so that only the workspace and the other wrapped applications associated with that workspace can launch the wrapped application. For certain applications, such as the browser, a predefined set of URLs are added to the wrapped application, based on the known set of protocols that the application handles.

Furthermore, during the wrapping process, the document type(s) permitted for use by the wrapped application are defined (block 355). This may be accomplished by defining a corresponding new document type for all document types defined in the wrapped application. According to one embodiment of the disclosure, the new document type name is defined by using the unique identifier assigned to the wrapped application. The types of files that the new document type can handle are defined to be the same set as that of the predefined type that it is based on.

Also, the wrapping process is adapted to manipulate the privileged and/or permissions associated with the wrapped application (block 360). In particular, in accordance with security policies, if there are any privileges or permissions that need to be changed, these privileges or permissions are changed during static policy injection.

Lastly, the wrapping process is adapted to manipulate setting in resource files of the wrapped application (block 365). Such setting changes may alter the language and other display and playback aspects based on region.

2. Dynamic Policy Injection

Referring back to FIG. 3A, after static policy injection, the wrapped application (e.g. wrapped application $252_1$) is downloaded to the wireless device (block 310). When the wrapped application is launched at run-time, the dynamic policy injection process is conducted (block 315).

More specifically, as shown in FIG. 3C, when the received wrapped application is launched, the executable of the wrapped application begins to run (blocks 370 and 375). As a result, the library initialization function is called. Since the dynamic library corresponding to the policy enforcer is configured to be the first library in the dynamic load library, the policy enforcer is initiated and begins execution (block 380).

When the executable of the wrapped application begins to run, the policy enforcer runs first and changes the in-memory symbol table by replacing the symbols for the intercepted system calls with the ones that are predefined to replace those basic calls (block 385). Additionally, the framework calls of the binary are replaced with predefined calls, for example, using a technique called "Method Swizzling," where Objective-C code patches with the framework call modifications may be utilized (block 390).

However, in supporting objected-oriented processing, there may be an additional need to intercept methods that are defined as part of an interface. Name of the class that implements the interface are not always known at runtime. In this case, a function is intercepted where corresponding object implementing the interface is passed as a parameter. In this function, the classname is found and then interception hook for the interested method is installed.

Thereafter, the executable application runs with its behavior controlled by the policy enforcer (block 395). In the replaced framework and system calls, the security policy check is conducted first and any action(s) that needs to be taken are performed before executing any of these function calls.

B. Inter-Application Communications

The injection of a policy enforcer is conducted, in part, to provide a mechanism where the sandboxed applications, that now have undergone binary instrumentation and part of the same user workspace, can communicate with each other. Running in wrapped application $250_i$ ($1 \leq i \leq N$) of FIG. 2, security policy enforcer $252_i$ receives security policies provided from server 110 and enforces the security policies on the actions and events of the application. Other non-executable files, included as part of wrapped application $250_i$, are also processed.

1. Launch Targeted Wrapped Application

Figure 4A:
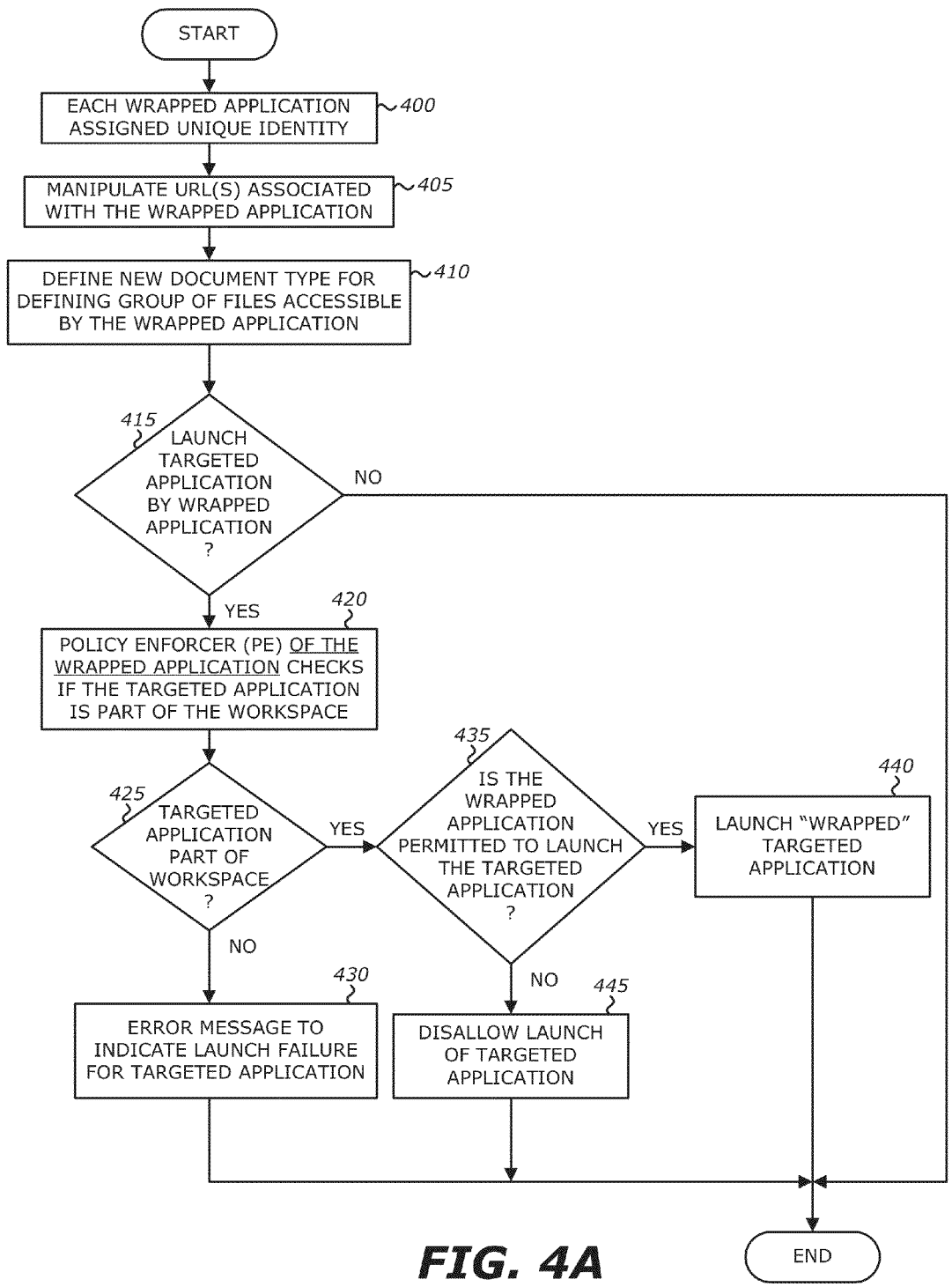
FIG. 4A is an exemplary flow diagram of the operations performed by a policy enforcer of a wrapped application to logically relate other wrapped applications within the same workspace to allow communications between these applications.

Referring to FIG. 4A, an exemplary flow diagram of the operations performed by a policy enforcer of a wrapped application to logically relate other wrapped applications within the same workspace to allow communications between these wrapped applications is shown. As part of the wrapping process, each wrapped application is assigned a unique identifier. Also, unique URLs and document types may be assigned to correspond to URLs and document types that the wrapped application already handles (blocks 400, 405 and 410). For some applications, new URLs and document types are added to the appropriate definition files of the wrapped application.

Thereafter, when the wrapped application attempts to launch, the policy enforcer of the wrapped application first checks if the targeted application is part of the workspace (blocks 415, 420 and 425). If the targeted application is not part of the workspace, an error message is displayed to indicate a launch failure for the targeted application (block 430).

However, if the targeted application is part of the workspace, a determination is made if the wrapped application is permitted to launch the targeted application, as defined by the security policies associated with the platform provided by the wireless device (block 435). More specifically, for a wrapped application, the policy enforcer may change the behavior of the wrapped application by intercepting and changing a URL associated with the targeted application before the URL goes to the platform for launching the targeted application. As a result, based on the interception and modification of the URL by the policy enforcer, the wrapped application may be allowed to or prevented from launching the targeted application (blocks 440 and 445).

2. Information (Document) Exchange

Figure 4B:
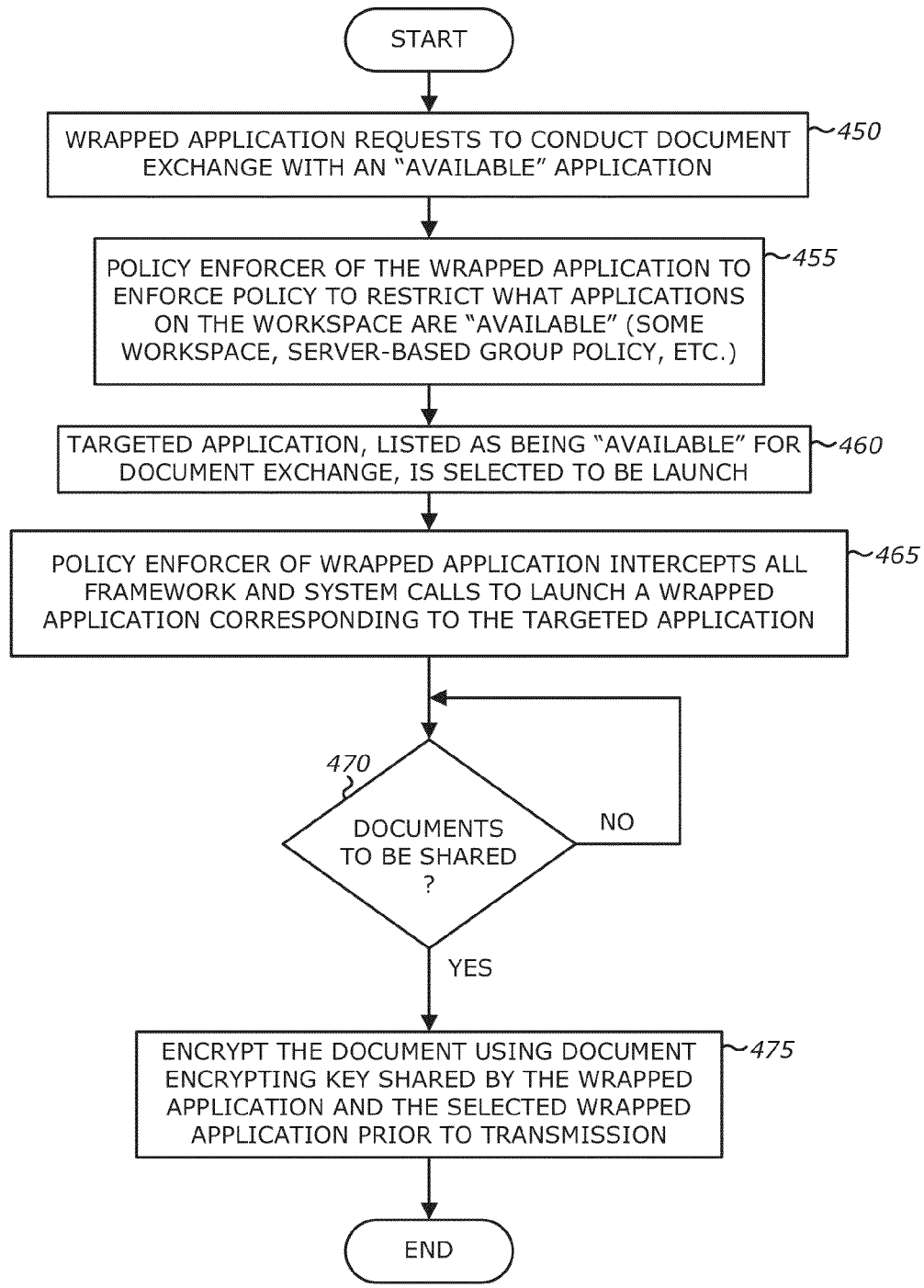
FIG. 4B is an exemplary flow diagram of the operations performed by a policy enforcer of a wrapped application to logically restrict document exchange behavior between the wrapped application and other wrapped application within the same workspace.

Referring to FIG. 4B, based on the security policies received from the server and locally stored, if a wrapped application tries to open a document in another application, the list of "available" applications, as selectable options to the user, is displayed (blocks 450 and 455). As an example, the list may be a drop-down list, displayed in the workspace, which contains the names of applications that may be opened by the user.

According to one embodiment of the disclosure, during enforcement of certain security policies, the policy enforcer may be adapted to remove some applications provided in the workspace from the list as these applications are not available for document exchange (block 455). As a result, the list is restricted to include applications that are (a) part of the workspace, and (b) in compliance with security policies defined on the server. For example, two wrapped applications belonging to the same workspace may still not be able to share a document because of the fact that they belong to different application groups that are not allowed, by security policies, to exchange documents with each other. A "document" is generally defined as text, image(s), video, or any content or data that is associated with and/or produced by a particular application.

Upon selection of the target application, being an application listed as being available for document exchange, the policy enforcer of the wrapped application intercepts certain framework and system calls to launch a selected wrapped application corresponding to the targeted application from which documents are requested to be shared (blocks 460 and 465).

When two wrapped applications pass documents to each other, document exchange communications are secured by encrypting the shared document using a shared encryption key (blocks 470 and 475). More specifically, the document encryption key is stored in the shared data store 235 of FIG. 2. Herein, the wrapped application (source) encrypts the document before passing it over to the targeted wrapped application (destination), and the targeted wrapped application fetches the encryption key from the data store and decrypts the document before starting to use it.

It is contemplated that, based on the security policies defined by the network administrator, the same document exchange encryption key could be used by all wrapped applications that belong to the same user workspace, or different encryption keys may be used for different groups of wrapped applications within the workspace. For example, all of the wrapped applications permitted to operate offline could utilize a first shared encryption key, whereas all wrapped applications that are permitted to operate only when online could use a second shared encryption key different than the first shared encryption key.

It is contemplated that different platforms for different wireless devices may support inter-application communications through various means. However, the purpose is the same—allowing these wrapped applications to work together in a collaborative way to provide the best user experience and productivity to the user. On certain platforms, when the user wants to share information from one application to another, such as the document exchange described above, the platform provides some basic default options such as sending that data over electronic mail (email), storing that data on the device, or being able to view that data on the same device or another device. In a secure workspace that is controlled by the security policies, all these options need to be controlled. The policy enforcer displays only those options to the user that are allowed by the security policies defined on the server.

For protecting the privacy of the data, even when the default options are displayed to the user, the underlying default applications that get launched when the user chooses a particular selection are changed to launch the corresponding wrapped applications that are part of the same workspace. For example, if the platform provides an option to email a document that the user would like to share, when the user chooses that option, instead of the default platform-provided email application getting launched, the policy enforcer changes the app-launch call to launch the wrapped email application that is part of the same workspace as the source application that is user is sharing the document from.

C. Workstation Integration

Although, as shown in FIG. 2, workspace application 240 and wrapped applications 250$_1$-250$_N$ are independent (sandboxed) applications, the following approach is designed to inter-relate these wrapped applications 240 and 250$_1$-250$_N$.

Figure 5:
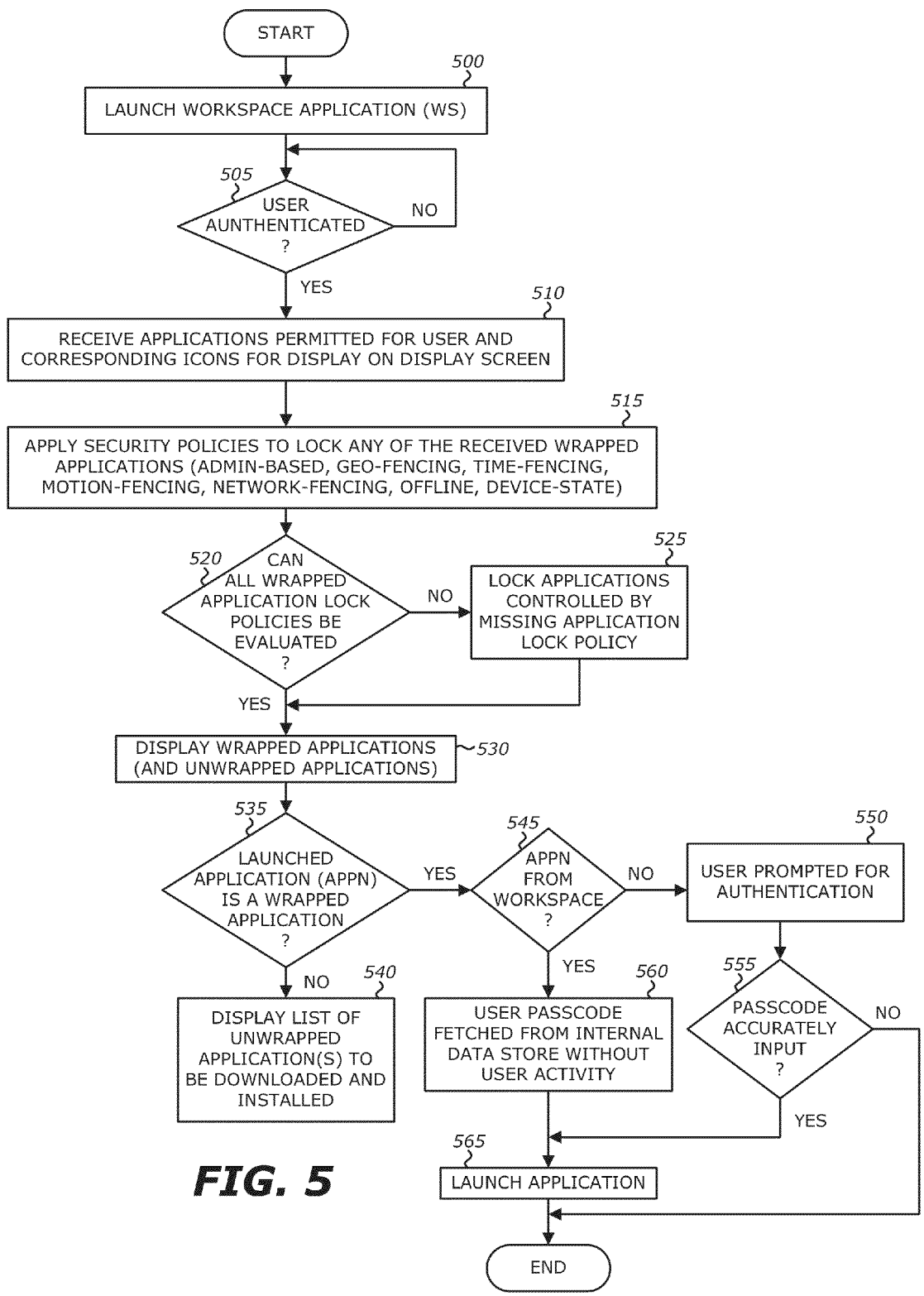
FIG. 5 is an exemplary flow diagram of the operations conducted to logically relate a workspace application to wrapped applications in order to provide a logical environment that, through a graphics user interface (GUI) display, conveys a perception to the user that the wireless device is operating in an enterprise-controlled workspace.

Referring now to FIG. 5, an exemplary flow diagram of the operations conducted to logically relate a workspace application to wrapped applications in order to provide a logical environment that, through a graphics user interface (GUI) display, conveys a perception to the user that the wireless device is operating in an enterprise-controlled workspace is shown. Herein, in response to an attempt to launch the workspace application (block 500), the user is required to be authenticated using her enterprise credentials (block 505).

Figure 6A:
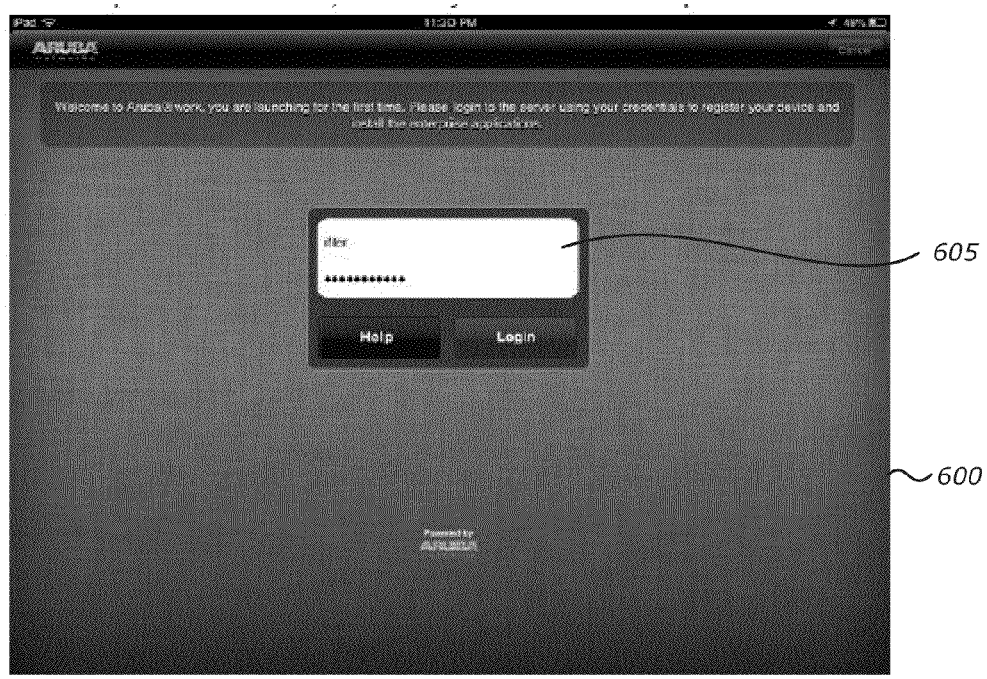
FIGS. 6A-6C are exemplary screen shots illustrating authentication using either an enterprise credential and/or personally configured passcode to control access to the workspace.

As shown in FIG. 6A, user authentication may be conducted through active directory (AD) authentication (or other forms of well-supported two-factor authentication). According to this embodiment of the disclosure, login screen 600 is provided under control of the workspace application to allow the user to enter her enterprise credentials 605 for comparison to authenticate the user. Upon authentication, the workspace is configured for the user by downloading the appropriate applications.

Figure 6B:
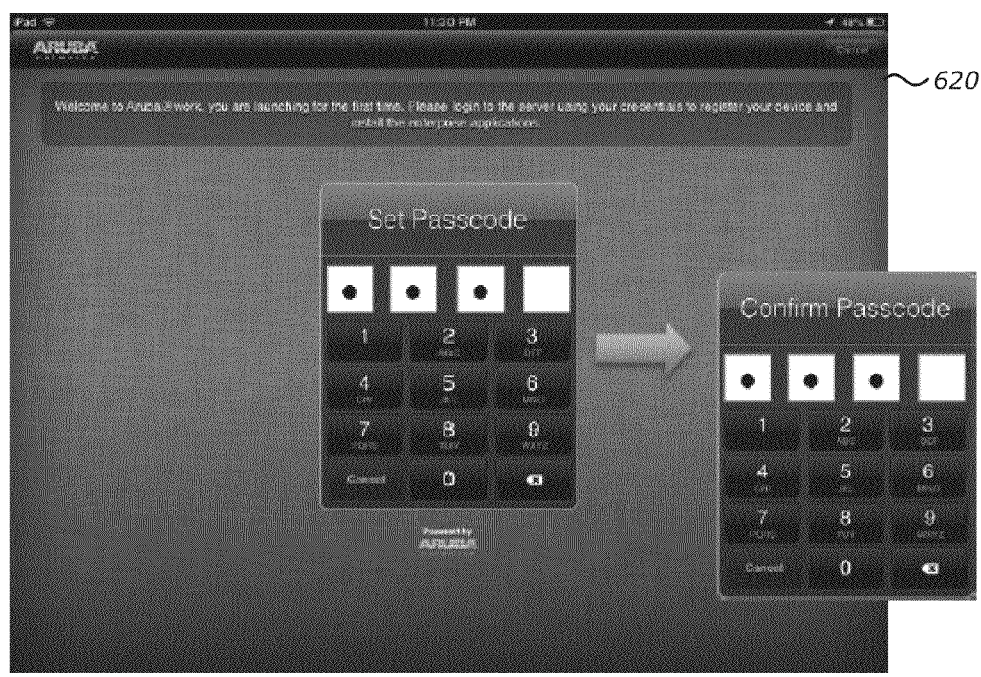
Figure 6C:

Alternatively, as shown in FIGS. 6B and 6C, a personally configured pass code may be used, where the pass code is preset beforehand upon initial launching of the workspace. As shown in FIG. 6B, the pass code is preset by providing the user with a Set Passcode dialog box 620 for entry of the pass code by the user. Thereafter, the user will be provided with a different dialog box 630 for later user authentication as shown in FIG. 6C. Where the user chooses a policy compliant pass code, the policy for which has been configured on the server by the network administrator is previously pushed down to the workspace. Herein, the workspace application locally authenticates the user.

Figure 7:
FIG. 7 is an exemplary screen shot illustrating the workspace including (unlocked) wrapped applications that are accessible by the user and (locked) wrapped applications that are inaccessible by the user.

When provided access to the workspace, the user is presented with a display screen 700 (e.g. springboard or home screen) that displays all icons 710 associated with the wrapped application that are permitted for the user based on security policies as shown in FIG. 7 (block 510). Any available application may be launched by selecting one of the application icons.

However, as returning back to FIG. 5, before rendering the display screen, the policy enforcer applies the security policies and locks any of the received wrapped applications that are to be locked based on a variety of factors (block 515). One factor for locking an application may be based on an administrator's determination to manually lock the application. However, a wrapped application could be locked by the workspace due to one of the following reasons: (1) geo-fencing policy—the wrapped application should not be used at the current geographical location of the device; (2) time-fencing policy—the wrapped application is not supposed to be used at the current time; (3) motion-fencing policy—the application is not supposed to be used due to the device being in motion and beyond a policy-defined speed; (4) network-fencing policy—the device is on a network from which the application should not be accessed; (5) online application policy—the device is offline but the application is configured to be used only when the device is online (on the Internet); and/or (6) device-state policy—the application is locked due to the device being jailbroken, or the subscriber identification module (SIM) chip is replaced, or certain other device attributes have changed or not available for access (e.g. camera, etc.).

In the event that lock policies for all of the wrapped application cannot be evaluated, such as where related information is not being available (e.g. geographic location services are turned off to disrupt geo-fencing constraints), the workspace takes a fail-close approach and locks the wrapped application, thereby precluding the user for using the wrapped application unless security policies can be analyzed (blocks 520 and 525).

After applying the lock policies, the wrapped and unwrapped applications associated with the user workspace are displayed (block 530). As shown in FIG. 7, where a wrapped application is locked, lock icon 720 is provided to overlay icon 730 associated with that wrapped application in order to provide the user visibility as to what applications within the workspace are available to her. Of course, it is contemplated that, in lieu of conducting a locking operation, the wrapped application(s) could be de-provisioned so that no icon of the wrapped application is displayed.

If a user launches an "unwrapped" application, a list of unwrapped applications may be displayed to selectively download and install (blocks 535 and 540).

Figure 8:
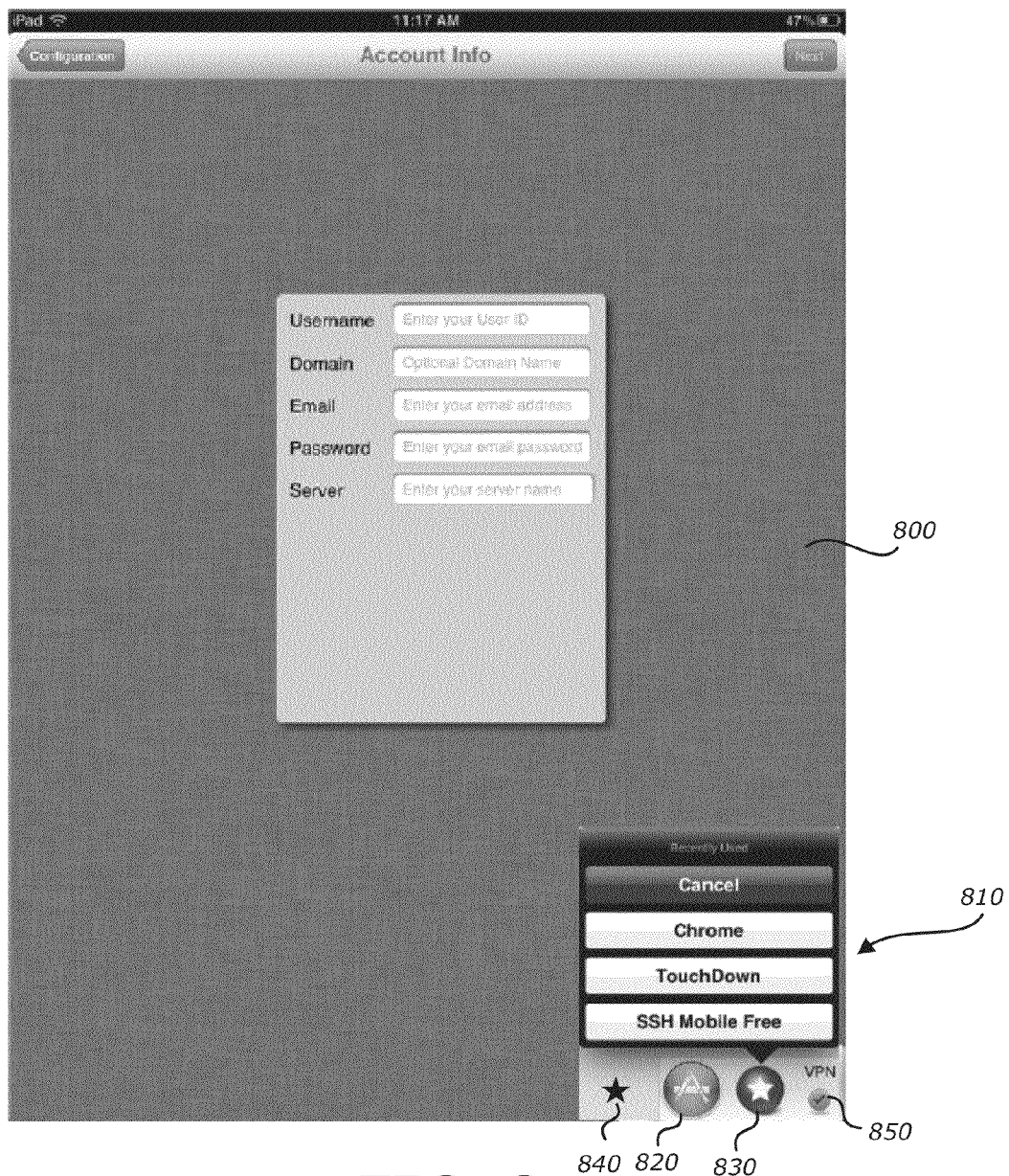
FIG. 8 is an exemplary screen shot illustrating a floating toolbar that is displayed to overlay on a display screen produced by one of the wrapped applications of FIG. 7 upon execution.

However, where the user launches a wrapped application from the workspace, as shown in FIG. 8, a floating toolbar 810 is displayed on a window or display screen 800 associated with the launched wrapped application. According to one embodiment of the disclosure, floating toolbar 810 provides the navigation options such as returning to the workspace, or switching to another wrapped application that belongs to the workspace.

According to one embodiment of the disclosure, floating toolbar 810 displays a plurality of user interface (UI) components that may be selected by the user. These UI components include (a) Home 820, (b) Recently Used Applications 830, (c) Favorites 840, and (d) Virtual Private Network (VPN) Status 850, which are described below:

(a) Home 820: While a wrapped application is running, if the user wants to go back to the workspace display screen (e.g., provided as springboard, dashboard, etc.), the user selects Home button 820 on toolbar 810 to return to the workspace display screen.

(b) Recently Used Applications 830: As the name suggests, this UI component on toolbar 810 displays a list of entries that collectively identifying the wrapped applications that were recently used. The user can activate any of the listed wrapped applications to launch, without having to go to the workspace display screen illustrating the wrapped applications in order to launch that wrapped application.

(c) Favorites 840: The user can create a list of favorite wrapped applications that she uses frequently in her workspace. This UI component assists the user to easily switch between her favorite applications without have to go to the workspace display screen illustrating the wrapped applications in order to launch that wrapped application.

(d) VPN Status 850: This UI component appears if the wrapped application is configured for an application-specific VPN tunnel. It displays the status of connectivity for the VPN tunnel, especially no VPN tunnel where the wireless device is already on the corporate network, the VPN tunnel is already connected and/or the VPN tunnel is disconnected. If the VPN tunnel is established, the user can select this UI component to get the details of the connection, such as "Packet In" and "Packet Out" information.

Referring back to FIG. 5, the launching of a wrapped application from the workspace, the switching among the wrapped applications through the use of floating toolbar 810, and the returning to the workspace using floating toolbar 810, all collectively provide an experience as if the user were operating in a desktop or virtual device that contained only the workspace application and other wrapped applications that belong to the workspace.

Moreover, if multiple workspaces are provisioned to wireless device 100 of FIG. 1, when the user logs into a workspace, she just operates in that workspace and uses the applications that are part of that workspace—as if a single physical device is converted to multiple virtual devices. Each virtual device is represented by a workspace application and the wrapped applications that are administrator configured to be part of that workspace.

If a wrapped application belonging to a workspace is not launched from that workspace, the user is asked to authenticate before launching the wrapped application (blocks 545-555 and 565). For example, if the user manages to launch the application through platform-specific means other than the workspace, the user will be prompted to authenticate, using the enterprise credentials or the pass code, depending on the security policies configured by the network administrator.

Similarly, when the user switches directly between the wrapped applications of a workspace, using the floating toolbar 810 of FIG. 8, the user is not asked to authenticate as the user is interpreted to be operating within the workspace (blocks 560 and 565). The above described behavior is achieved by the following approach:

1) The workspace application stores the user pass code in the shared data store before launching the wrapped application.
2) The wrapped application after launch fetches the pass code from the shared data store and refrains from prompting the user to enter the pass code. The wrapped application then deletes the pass code from the shared data store.
3) The same approach is taken when a wrapped application is launched from another wrapped application, using the floating toolbar.
4) If a wrapped application is not launched from either the workspace or from the floating toolbar, the wrapped application is unable to obtain the pass code from the shared data store, and thus, the policy enforcer of the wrapped application prompts the user to enter the pass code.

The workspace also provides a view of the unwrapped applications to the user. Being "unwrapped," these applications are not controlled by the administrator-defined security policies. Instead, these "unwrapped" applications could only be controlled by certain high-level security policies (e.g. installation, uninstallation, etc.) if the server manages the wireless device.

It is contemplate that, if the wireless device is not configured to be managed by the server, those unwrapped applications configured by the administrator may be adapted to appear on the user's workspace as recommended applications that the user can explicitly install from the public application stores as described above. Hence, wrapped applications and unwrapped applications may appear on the same workspace springboard, but are differentiated by different view of the different application groups.

D. Workstation Auto-Provisioning

As describe above, server 110 of FIG. 2 defines policies for configuring the workspace (e.g., which applications belong to the workspace as determined dynamically by the user-specific Role-based Access Control "RBAC" authorization policies defined in an enterprise directory such as Active Directory "AD" or in some other policy manager) as well as defines security policies applied by workspace application 240 and wrapped applications $250_1$-$250_N$ for the entire workspace. When wireless device 100 is registered for the application control services, after successful user authentication, based on the user-specific policies, workspace application 240 and all of the applications that belong to its workspace are automatically provisioned to wireless device 100 as described below.

1. Workstation Auto-Provisioning (Cleanup)

Referring to FIGS. 9A-9D, exemplary flow diagrams and screen shots of a first illustrative embodiment for automatic provisioning and de-provisioning of wrapped applications within the workspace are shown. Prior to provisioning the workspace application, it is contemplated that one or more applications uploaded on the server undergo a wrapping process (binary instrumentation), which may be conducted through an automated process or at least partially through manual input by the administrator. The wrapped applications are then stored on the server.

The user uses a browser to open the device enrollment page that is provided by the server. The user authenticates using his credentials against the server. After successful user authentication, the server pushes a configuration payload (file) associated with the workspace to the device. The user is prompted to install that configuration payload on the device, after which the server pushes the workspace application to get installed on the device.

After the workspace application is successfully installed (block 900), as an optional operation as represented by dashed line, user authentication may be initiated upon launching the workspace application for the first time (block 905). After successful authentication, if user authentication is necessary, the workspace application fetches the catalog of wrapped applications that are provisioned for the user (block 910).

Thereafter, the workspace application then automatically requests all of the wrapped applications from the server (block 915). The server responds by sending the wrapped application payload and a corresponding configuration file for each application (block 920). The workspace application then schedules the installation of each wrapped application into memory of wireless device. On some platforms, the workspace application just has to point to the server and provide the platform with a single configuration file that has the information of all the wrapped applications that belong to the user's workspace. For this embodiment, the workspace application fetches the application payload directly from other networked sources, different than the server, and installs the wrapped applications (as well as any unwrapped application).

As part of the configuration change on the server, when a particular wrapped application needs to be de-provisioned from a user's workspace, the server dynamically creates a cleanup application corresponding to the wrapped application that has been de-provisioned (blocks 925 and 930). This cleanup application is given the same application identifier as that of the wrapped application, and a higher application version number so that the cleanup application acts as an upgrade for the wrapped application installed on the user's device.

The cleanup application does not contain any upgraded binary, data or configuration files. Rather, the cleanup application just contains the code to remove all the data that was created by the wrapped application at its initial launch.

Figure 9A:
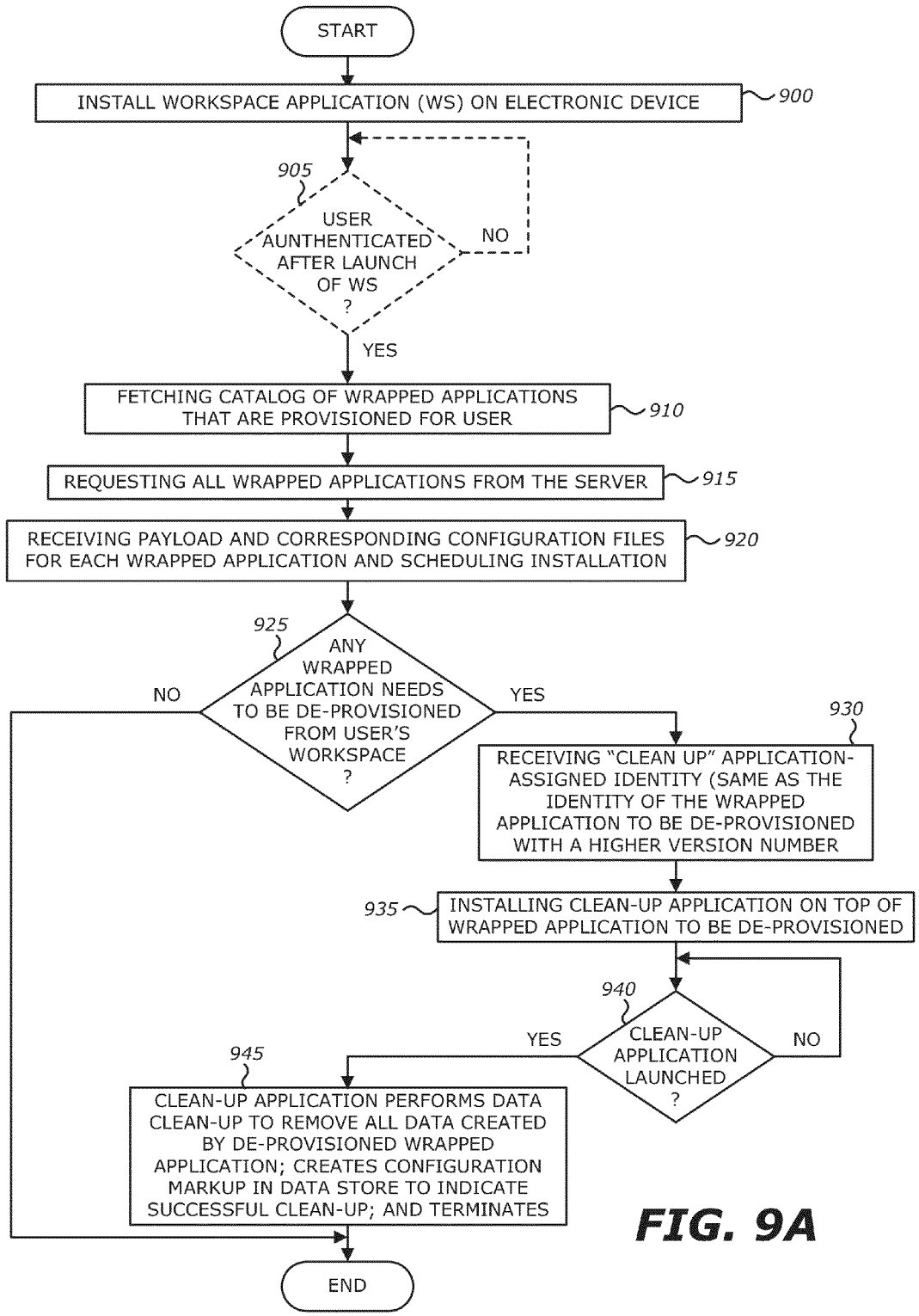
FIGS. 9A-9D are exemplary flow diagrams and screen shots of a first illustrative embodiment for automatic provisioning and de-provisioning of wrapped applications within the workspace.
Figure 9B:

When the workspace application or the other wrapped applications fetch the policies from the server, and the policies are evaluated, the workspace application requests the application upgrade for the application that has been de-provisioned from the workspace. This request is satisfied by the server, and cleanup application ("Application") 950 gets installed on top of the de-provisioned wrapped application (block 935), as an upgrade as shown in FIG. 9B.

Returning back to FIG. 9A, when the user initially launches the cleanup application where the user thinks the original wrapped application is being launched from the workspace, the cleanup application performs cleanup operations by removing all data created by the de-provisioned wrapped application and terminates (blocks 940 and 945). The cleanup application creates a configuration markup in the shared data store to indicate that it has performed the cleanup operations successfully. This configuration markup may correspond to the setting of a flag with data store 235 of FIG. 2 that is associated with the de-provisioned wrapped application to indicate that the cleanup operation has been completed.

Figure 9C:
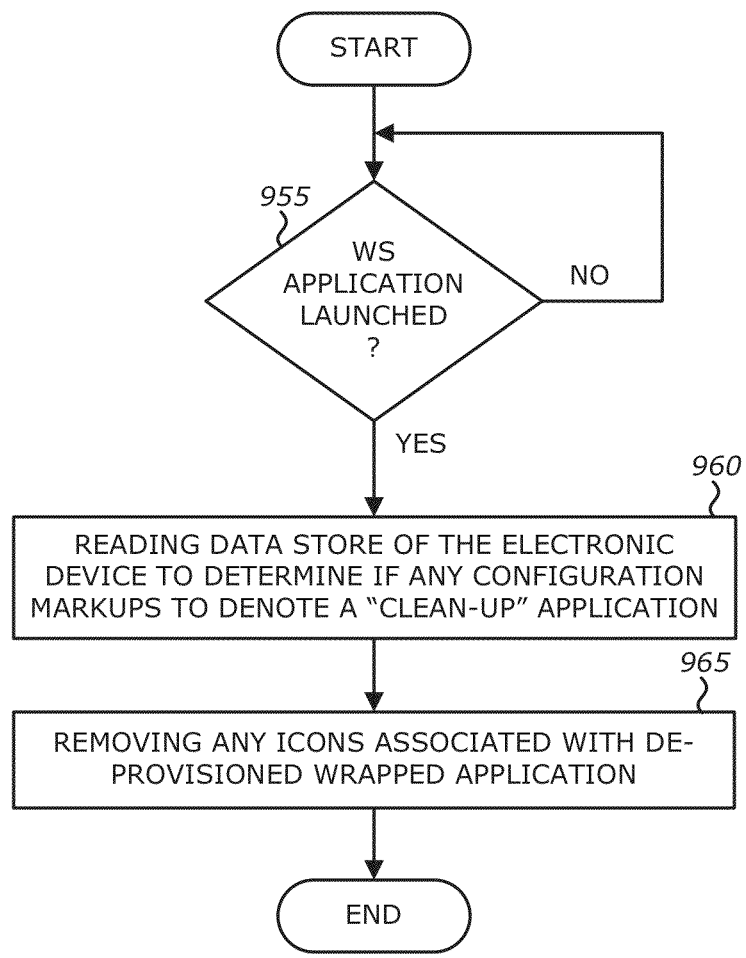
Figure 9D:

Hence, as shown in FIG. 9C, the next time the user launches the workspace, the workspace removes the application icon 950 corresponding to the de-provisioned wrapped application from the springboard after reading the configuration markup from the data store (blocks 955-965) as shown in FIG. 9D.

2. Workstation Auto-Provisioning (Wipe)

Figure 10:
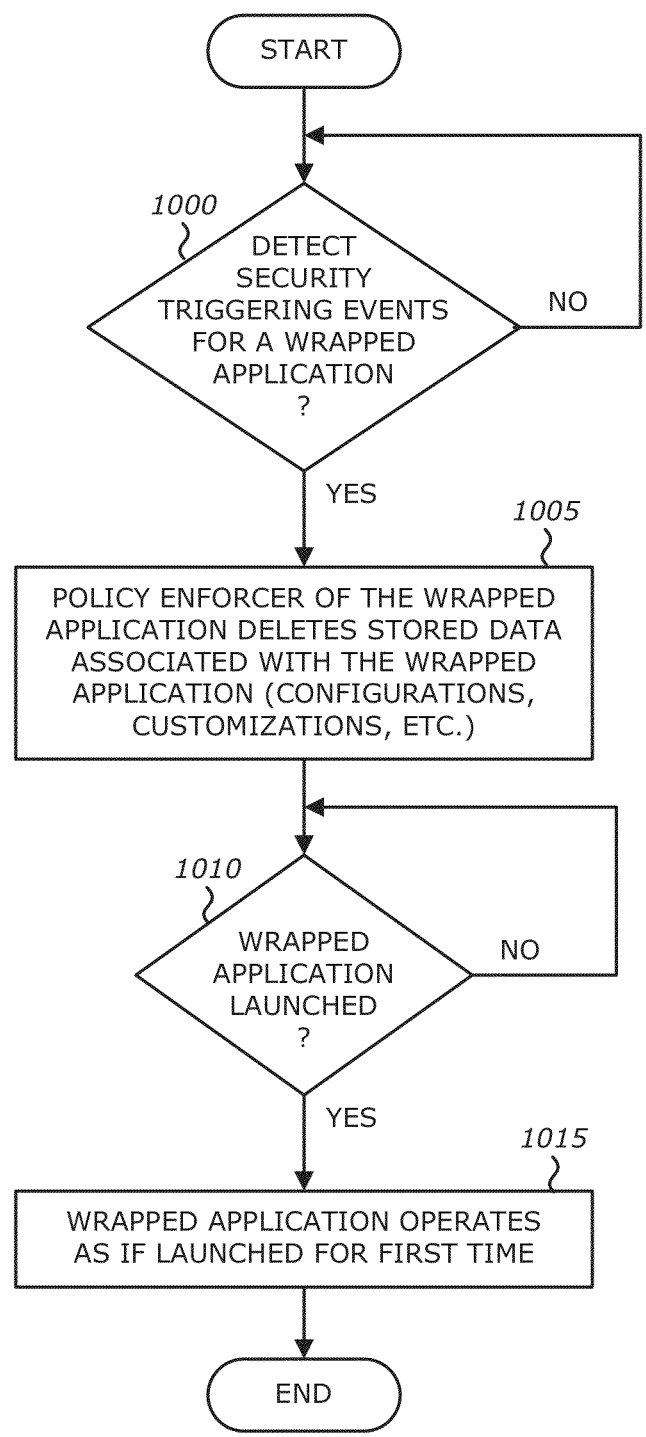
FIG. 10 is exemplary flow diagram of a second illustrative embodiment for automatic de-provisioning a wrapped application within the workspace to remove configuration data while retaining execution of the wrapped application.

Referring to FIG. 10, an exemplary flow diagram of a second illustrative embodiment for automatic de-provisioning a wrapped application within the workspace to remove configuration data while retaining execution of the wrapped application is shown. In some cases, a wrapped application belonging to a workspace may not be completely de-provisioned. Instead, in response to detecting certain security triggering events, the policy enforcer of the wrapped application deletes data associated with the wrapped application such as configuration data, customizations, or the like (block 1000 and 1005). Examples of certain types of security triggering events triggers may include, but is not limited or restricted to (1) the wireless device going offline beyond a predetermined period of time; (2) the wireless device has been jailbroken; (3) the user has left the company; (4) certain device attributes have been replaced or are compromised (e.g. removal of network SIM chip); or (5) an elapsed time between activation of this workstation auto-provisioning "wipe" scheme has elapsed.

Alternatively, in lieu of security triggering events associated with the wireless device, it is contemplated that these events may be in response to events or actions at the server. As illustrative examples, an application data wipe could be initiated by a policy definition or policy change on the server, or the server administrator explicitly choosing to wipe this described data on particular user device, or even based on the app's policy enforcer determining that certain policies have taken effect and the application data needs to be wiped.

Essentially, the application data wipe could be triggered from the server and enforced by the policy enforcer running within the wrapped application. Alternatively, the data wipe could be triggered by the policy enforcer itself based on the evaluation of the conditions of the wrapped application, that of the workspace and of the wireless device.

After it has been determined that the application should be "wiped' (i.e. certain data associated with the wrapped application should be deleted), the policy enforcer deletes the data and terminates the application (block 1005).

When the user launches the application for the next time, the user gets the experience as if she is launching that application for the very first time. This may be accomplished by removing all stored user configurations and/or customizations (blocks 1010 and 1015).

E. Application Auto-Provisioning

Figure 11A:
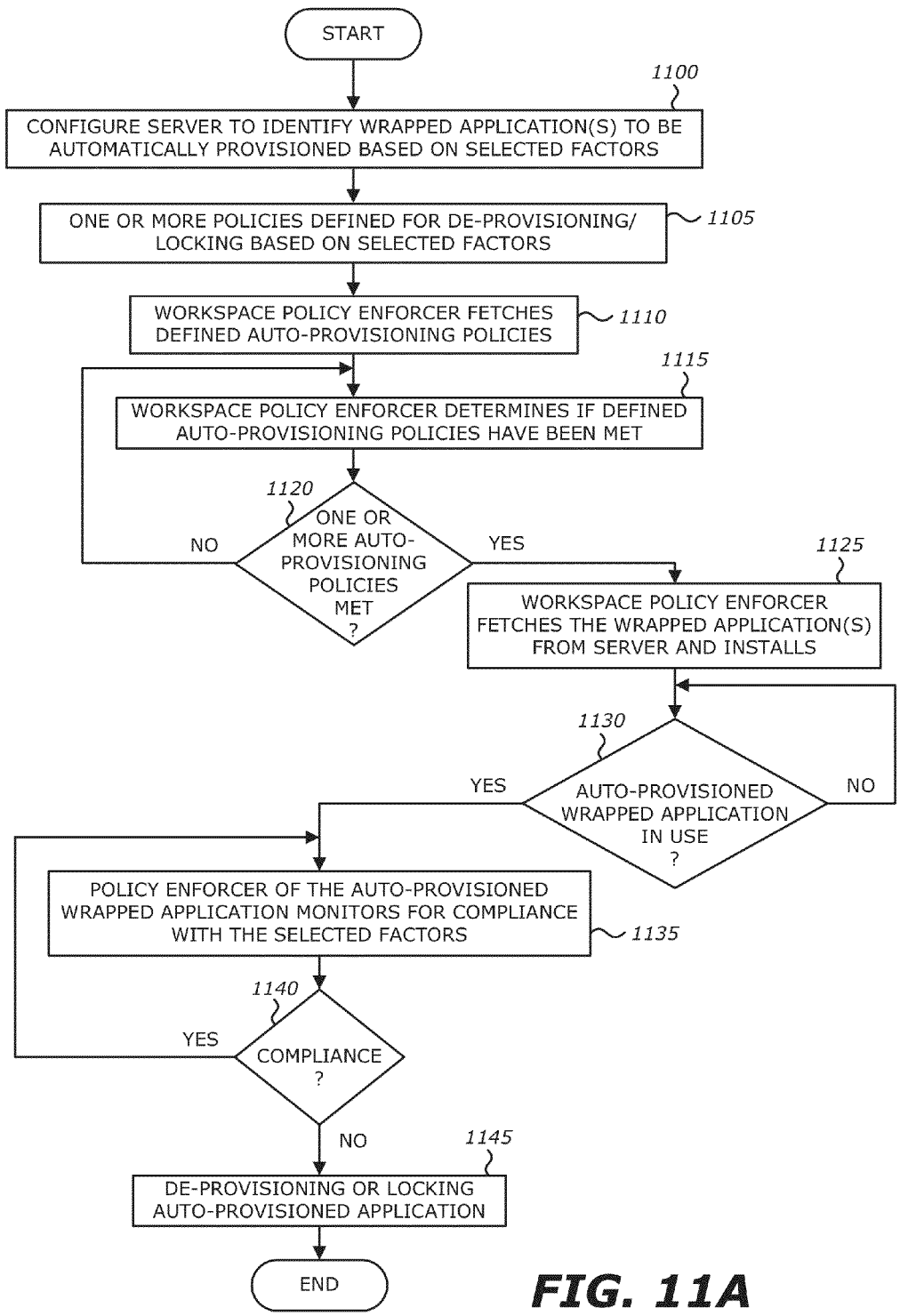
FIGS. 11A-11C are exemplary flow diagrams and a screen shot for automatic provisioning and de-provisioning/locking of wrapped applications based on particular factors.

Referring to FIG. 11A, an exemplary flow diagram directed to the operations for automatic provisioning and de-provisioning a wrapped application based on particular factors is shown. Initially, an administrator performs set-up operations for application provisioning. First, the server is configured to identify certain wrapped applications to be automatically provisioned in the workspace based on selected factors (block 1100). Thereafter, one or more auto-provisioning policies are defined by selected the particular factors for provisioning, de-provisioning and/or locking the wrapped application (block 1105). These factors may include geographic location of the wireless device and/or specified data and/or time.

After fetching the one or more auto-provisioning policies, the workspace policy enforcer constantly or periodically checks if an auto-provisioning policies have been met (blocks 1110-1120). If so, the workspace policy enforcer fetches the wrapped application from the server and schedules for installation (block 1125).

Figure 11B:
Figure 11C:

After the wrapped application ("APP 13") has been successfully installed as shown by icon 1150 in FIG. 11B and while the user is using the application, the workspace policy enforcer continues to monitor for compliance with the auto-provisioning policy (blocks 1130-1140). Upon determining non-compliance with the auto-provisioning policy, such as the user taking the wireless device out of the defined location or the defined time bracket has expired, the policy enforcer begins de-provisioning the wrapped application or locking the wrapped application as shown in FIG. 11C (block 1145).

It is contemplated that the de-provisioning operations may involve the use of the "cleanup" or "wipe" operations as described above. Rather than de-provisioning the wrapped application, the workspace policy enforcer may be adapted to lock the provisioned, wrapped application to prevent further use of the wrapped application (APP 13 1150) until the one or more policies have been satisfied again.

F. Dynamic Security Policy Updates

For security reasons, security policies normally are configured on server 110 of FIG. 2, and thereafter, are "pushed" down to wireless device 100 and applied to control usage of wrapped applications 250$_1$-250$_N$. Previously, on most wireless devices, the only reliable and predictive way to achieve immediate application of the security policies is by controlling workspace application 240 to run in the background all the time. However, this continuing running of workspace application 240 in the background drains battery power.

Figure 12:
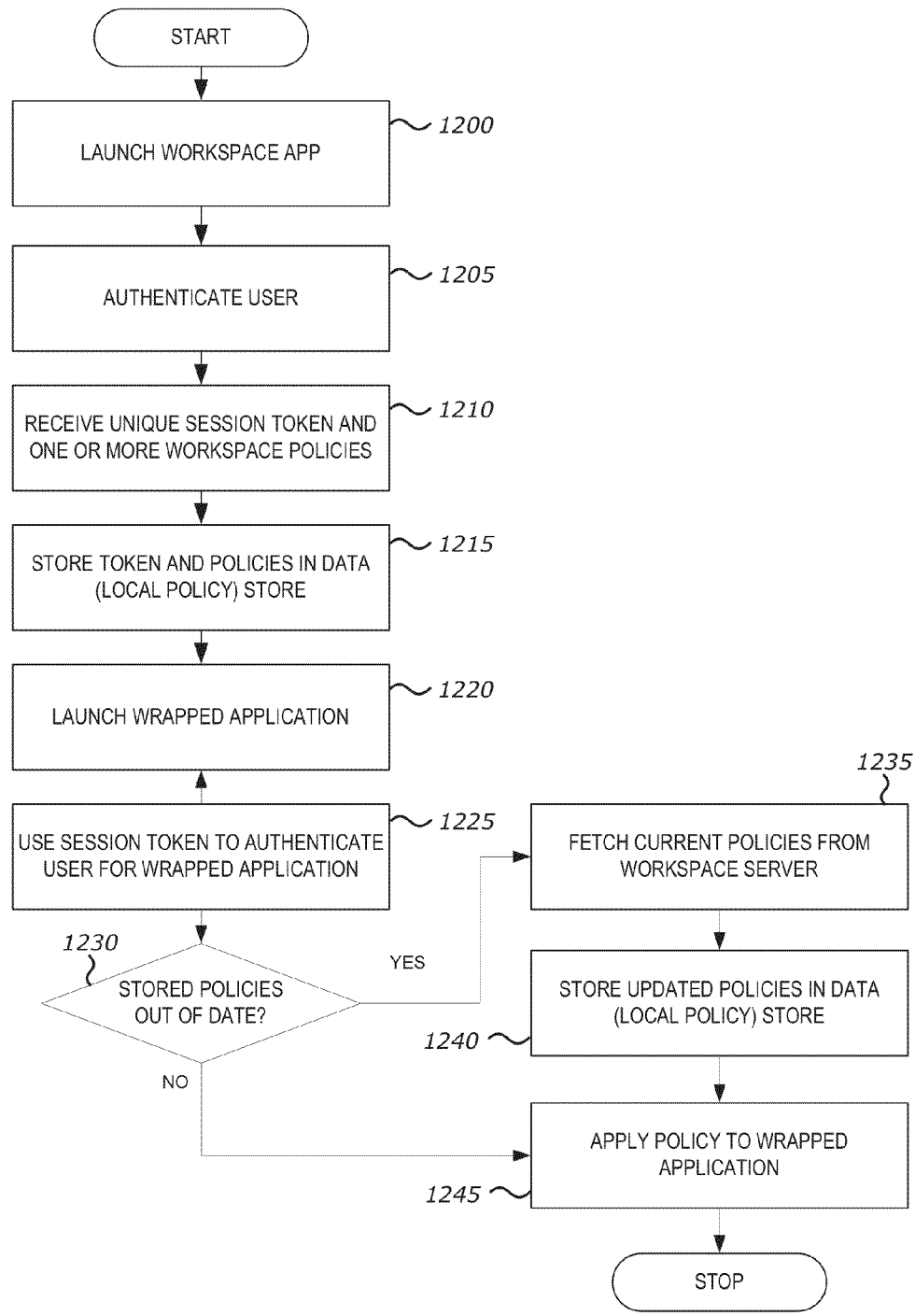
FIG. 12 is an exemplary flow diagram for dynamic updates of security policies without repetitive user authentication.

To combat this problem, as shown in FIG. 12, an exemplary flow diagram for dynamic updates of security policies without repetitive user authentication is shown. Herein, the workspace application and other wrapped applications installed on the wireless device share a common data storage (e.g. data store 235 of FIG. 2), which is used to enable the workspace application and/or wrapped applications to communicate with each other and also to store and access policies downloaded from the server.

Herein, upon an initial launch of the workspace application, a first user authentication process is conducted in which the user is authenticated using her established credentials (blocks 1200 and 1205). After successful authentication, the workspace application receives a unique session token from the server (see token 234 of FIG. 2) and writes that session token to the shared data store (blocks 1210 and 1215).

Thereafter, upon launching any other wrapped application at a later time, the wrapped application reads the session token from the shared data store. The wrapped application uses the token to authenticate the user in lieu of requesting the user to conduct a second user authentication process (blocks 1220-1225).

In order to avoid the necessity of the workspace application running in the background at all times and ensure that the latest security policies are fetched from the server and applied to the wrapped applications, the policy fetch from the server may be performed by every wrapped application running on the device. Hence, when any wrapped application is launched, one of the first operations performed by the launched wrapped application is to determine if the latest security policies have been fetched (block 1230). If so, the wrapped application merely applies these security policies (block 1245). However, if the latest security policies have not been fetched, the latest security policies from the server are fetched and written to the shared data store (blocks 1235-1240). If the latest policies have a change that applies to that application itself, the application applies the policy to itself (block 1245).

It is contemplated that, when none of the wrapped applications or the workspace application are running, the security policies are not fetched from the server. Rather, the need to apply the security policies occurs only when either the workspace application or any of the wrapped applications are running.

It is further contemplated that policy fetch from the server could also be configured to be periodic, where the periodicity is maintained by a timer. This security policy checking mechanism reduces the workload placed the wrapped applications. Also, when a policy fetch timer is set, the timer is shared across all the wrapped applications, so the timer keeps ticking when the user switches from one wrapped application to another, or between wrapped and unwrapped applications. If an unwrapped application was running when the timer expires, the next time the user launches a wrapped application, that application fetches the latest policies from the server.

G. Multi-User Workstation

Certain platforms are designed to be used by a single user. In one or more embodiments, in user-space virtualization technology-based workspace, multiple users can securely use the same device.

Figure 13:
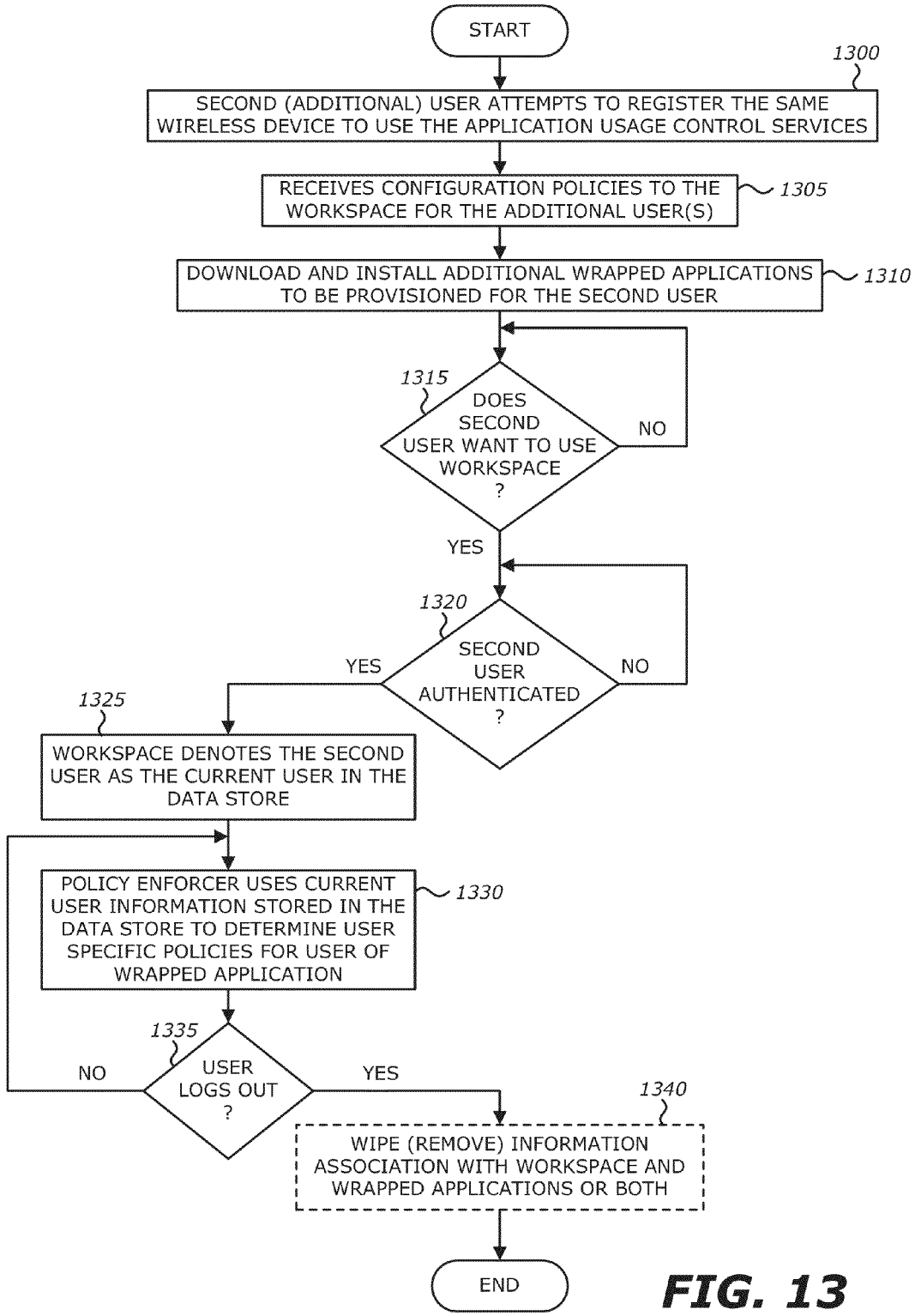
FIG. 13 is an exemplary flow diagram of the operations for virtualization of a multi-user workspace.

Referring to FIG. 13, an exemplary flow diagram of the operations for virtualization of a multi-user workspace is shown. Herein, a first user of the device registers the wireless device with the server. Thereafter, the workspace and other wrapped applications that belong to the workspace for that user are installed on the wireless device.

At a later time, a second user registers the same wireless device in the service (block 1300). Upon determining by the server that the wireless device has already been registered by the first user, the configuration policies for the second user are sent to the workspace (block 1305). Hence, the configuration policies for the workspace associated with the second user are downloaded instead of installing a new workspace and all the wrapped applications all over again. Any additional wrapped applications that need to be provisioned for the second user, as the second user could belong to a different user group or a different role policy applies to her, are downloaded and installed on the wireless device (block 1310).

When the second user wants to use the workspace, she uses her credentials to authenticate to the workspace and begins usage of the workspace (blocks 1315-1320). On successful user authentication, the workspace further stores data within the shared data store to denote that the second user is the current user of the workspace (block 1325).

When the user uses any of the workspace applications, the policy enforcer uses the current user information stored in the shared data store to apply the user-specific policies (block 1330).

After the second user is done using the workspace, she logs out of the workspace to allow other users to use that device, where any new users registering the same wireless device in the service would follow the sequence of operations describe above (block 1335).

The workspace could be configured, through security policies defined on the server, to wipe the entire workspace (and that of the wrapped apps) whenever a user logs out of the workspace (block 1340). This configuration would be advantageous where the wireless device is used at a kiosk and the wireless device is used by many users for short periods of time.

In certain other instances, again based on the security policies defined on the server, the workspace could be locked for specific users during specific predefined times of the day or certain days of the week, or during certain weeks of the year.

H. Application Notification

On many wireless devices, applications can display notifications to the user. A "notification" is an event that informs the user of new information is available for an application. Each notification provides perceivable information which may be visible (e.g. an illustrated number displayed on an icon associated with the application or an alert message) or auditory (e.g. a sound alert). When the user acts on that notification, the notification is no longer displayed or perceivable by the user.

In order to provide application notification in the policy restrictive workspace, notifications could be generated locally by the application or could be pushed down from the server to the application. For wrapped applications $250_1$-$250_N$ of FIG. 2 corresponding to a workspace, the same behavior is provided, without relying on the platform support.

Figure 14:
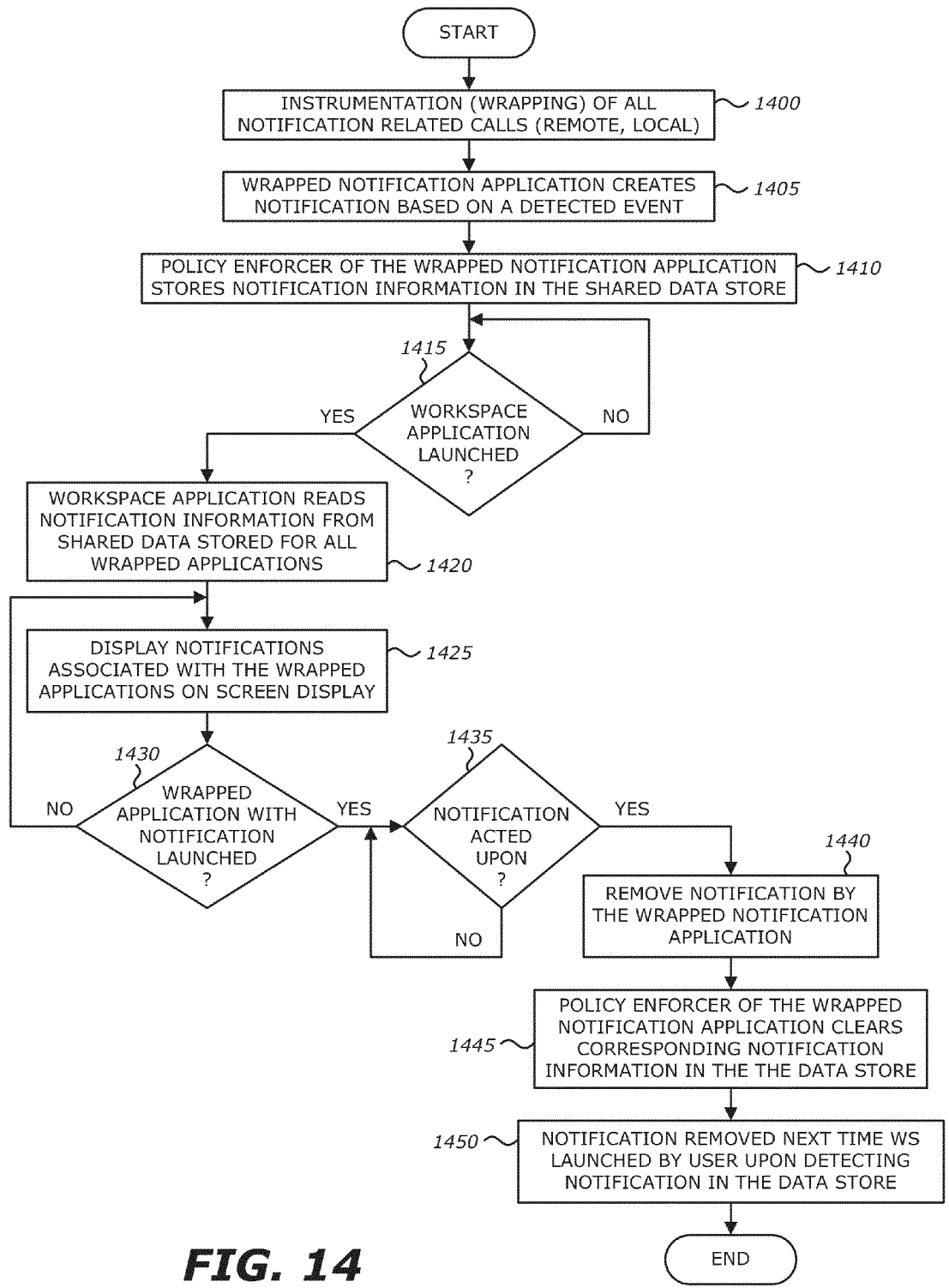
FIG. 14 is an exemplary flow diagram of the operations for supporting notification messages without platform support.

Referring to FIG. 14, an exemplary flow diagram of the operations for supporting notification messages without platform support is shown. Herein, all notification, local or remote, related calls are intercepted and modified during the instrumentation process of the binary application that is marked for creating or receiving notifications (block 1400)

When that wrapped application creates a notification, the policy enforcer for that wrapped application intercepts the notification information and stores the notification information in the shared data store (blocks 1405 and 1410).

When launched, the workspace application reads the notification information from the shared data store for all of the wrapped applications in that workspace (blocks 1415 and 1420). Thereafter, the management logic of the workspace application generates notification(s) to be perceived by the user. For instance, the notifications may be displayed on a display screen with the wrapped applications (block 1425).

After the wrapped application with a notification is launched, the notification is generated for display (or audio playback), and a determination is made as to whether the notification has been acted upon (blocks 1430 and 1435). If so, the wrapped application takes action to remove that notification. Since that call is also intercepted, the policy enforcer clears the corresponding notification information in the data store (blocks 1440 and 1445).

Hence, the next time the workspace application is launched and accesses the shared data store for notification information to find that the notification has been cleared for the application, the workspace application removes the notification from the springboard (block 1450).

I. Application Aliasing

It is noted that certain applications are not available on particular platforms. During policy configuration, server 110 of FIG. 2 needs to be configured to be able to identify which applications are available on which platforms. Application aliasing provides a solution for reducing administrative load associated with maintaining a listing as to which applications are available to which platform. This is accomplished by creating an automated equivalency chart for each application that is uploaded to or fetched by server 110.

Figure 15A:
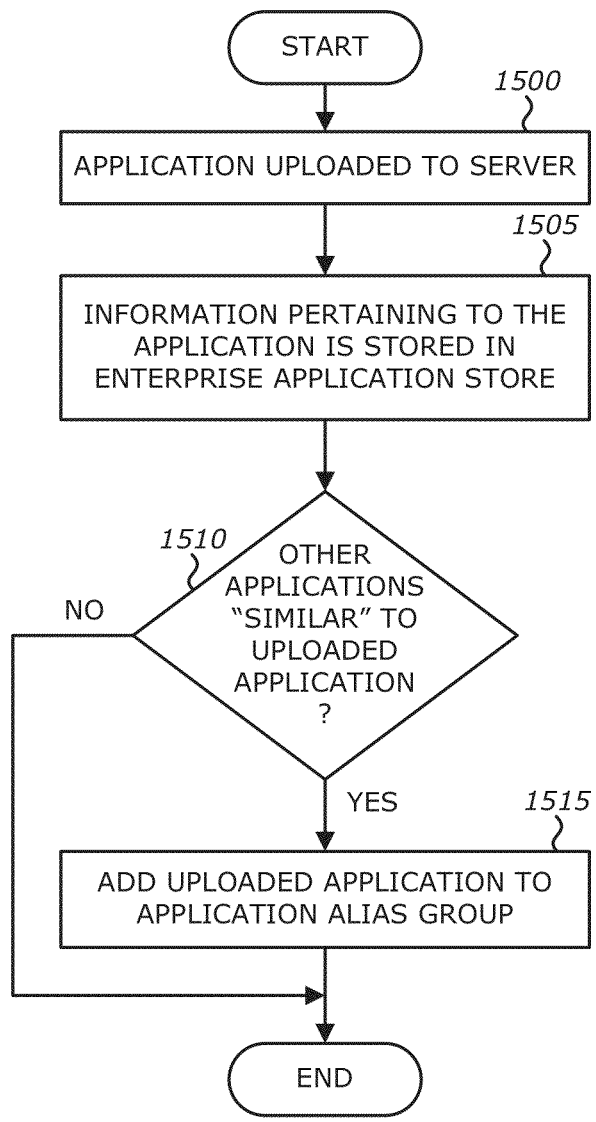
FIGS. 15A-15C are exemplary flow diagrams of application aliasing for provisioning of logically equivalent wrapped applications in response to a failure to satisfy the wireless device or usability requirements.

As shown in FIG. 15A, an application is uploaded to a server (block 1500). As part of the wrapping process, the server extracts information pertaining to application and stores the information into an enterprise application store (block 1505). According to one embodiment of the disclosure, the information may include one or more of the following: (1) category (e.g., business, games, book, consumer, sports, productivity etc.); (2) supported platforms; (3) supported electronic devices; (4) version number; (5) countries supported; (6) languages supported; (7) Usage Restrictions (e.g. geographical, age, etc.).

Thereafter, a determination is made as to whether there are other applications similar to the uploaded application. If so, according to one embodiment of the disclosure, the server may be adapted to associate (link) the uploaded application to other wrapped application that are already available on the server. An application is determined to be "similar" to another wrapped application based on whether the application is (i) part of the same category, (ii) supported by the same platforms, (iii) supported by the same wireless devices, or the like. Alternatively, in lieu of linking, explicit alias groups can be created, where the uploaded application is added to an application alias group (block 1515). An application alias group is a collection of applications that are similar in behavior, but some or all of the applications in that collection may not satisfy all the platform, device or usability requirements.

Figure 15B:
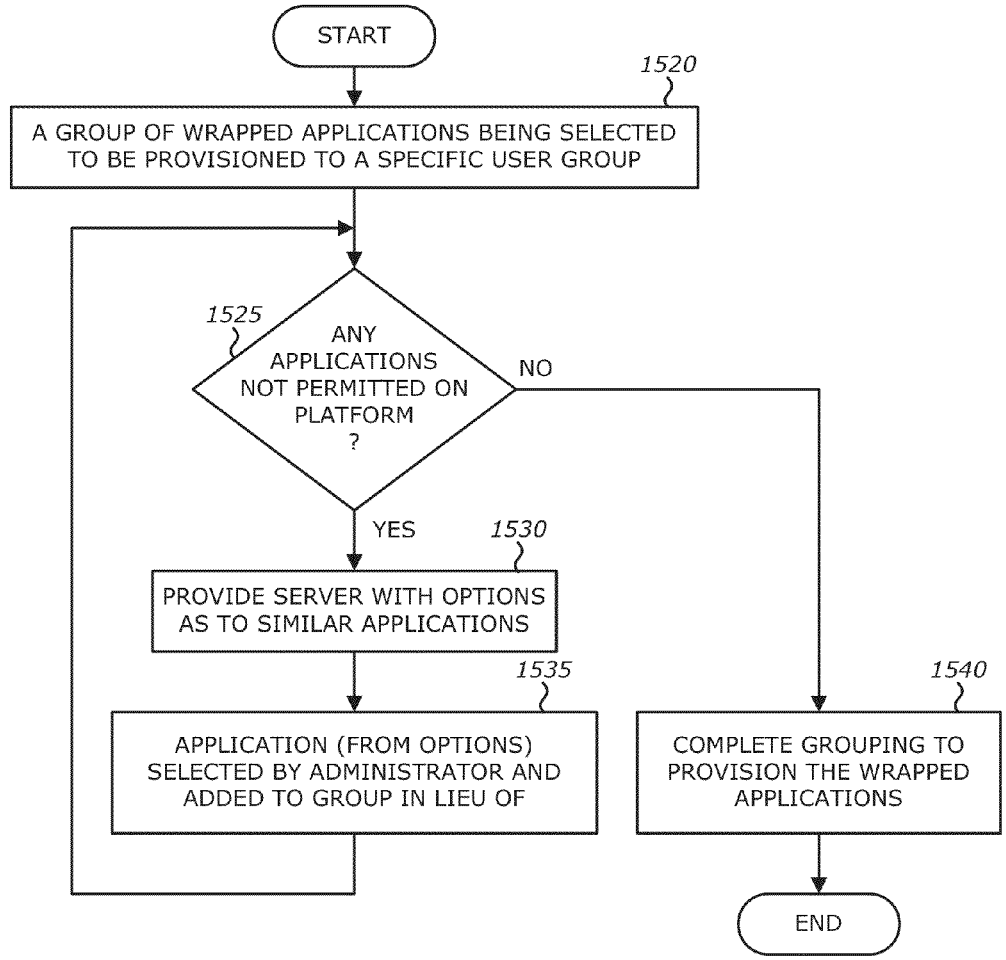

Referring now to FIG. 15B, when creating a group of wrapped application to be provided for a specific user group, a determination is made whether any applications are not permitted (or available) on a platform (block 1520 and 1525). For applications that are permitted, the server provides options to the administrator to choose an equivalent application from the selected application's alias group (block 1530). The administrator may select another application from the group and completes the application bundle definition (blocks 1535 and 1540).

Figure 15C:
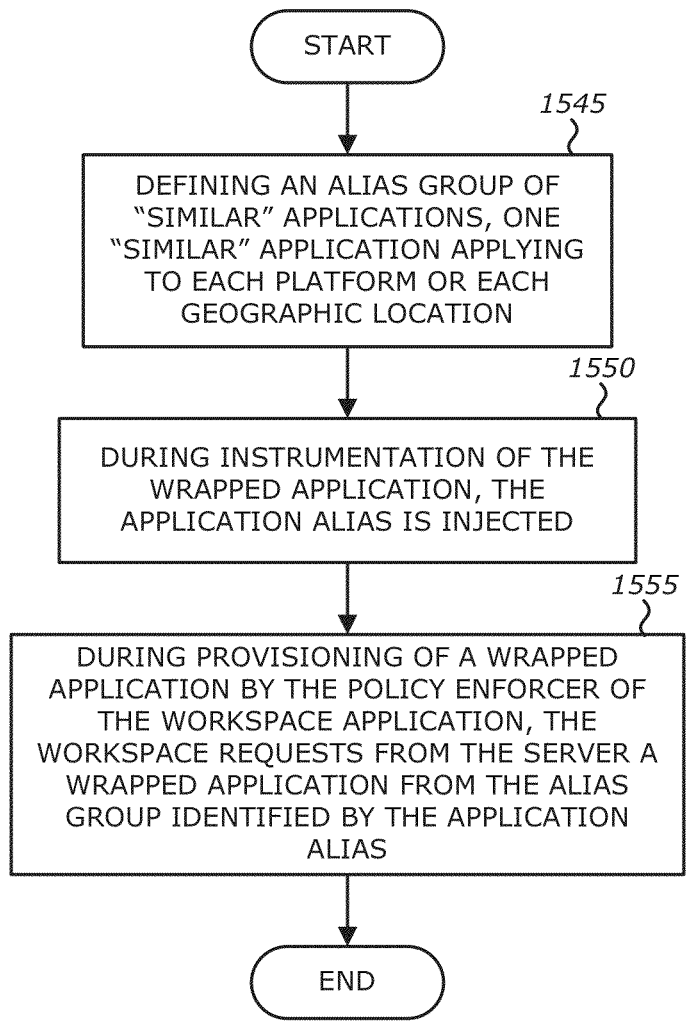

Referring now to FIG. 15C, the application aliasing process can be further automated by defining an alias group that has only one application that applies to each platform, a geographical area, or the like (block 1545). During the application bundle definition process, the administrator just selects the application alias and makes it part of the application bundle (block 1550). Thereafter, during the provisioning of that wrapped application on a device, the policy enforcer requests an application from that application's alias group based on the device and platform type and application related restrictions. The server sends that application from the alias group to the device and the application gets installed (block 1555).

However, as an alternative, instead of the policy enforcer requesting a specific application from the application alias group, the server chooses the appropriate application for the device based on the various attributes defined above. Since the server already has all the device, platform, geographical and user specific information (some provided by the workspace application to the server), it can easily select the correct application from the application alias group.

J. Application Containerization (Policy Enforcer in the OS)

Figure 16:
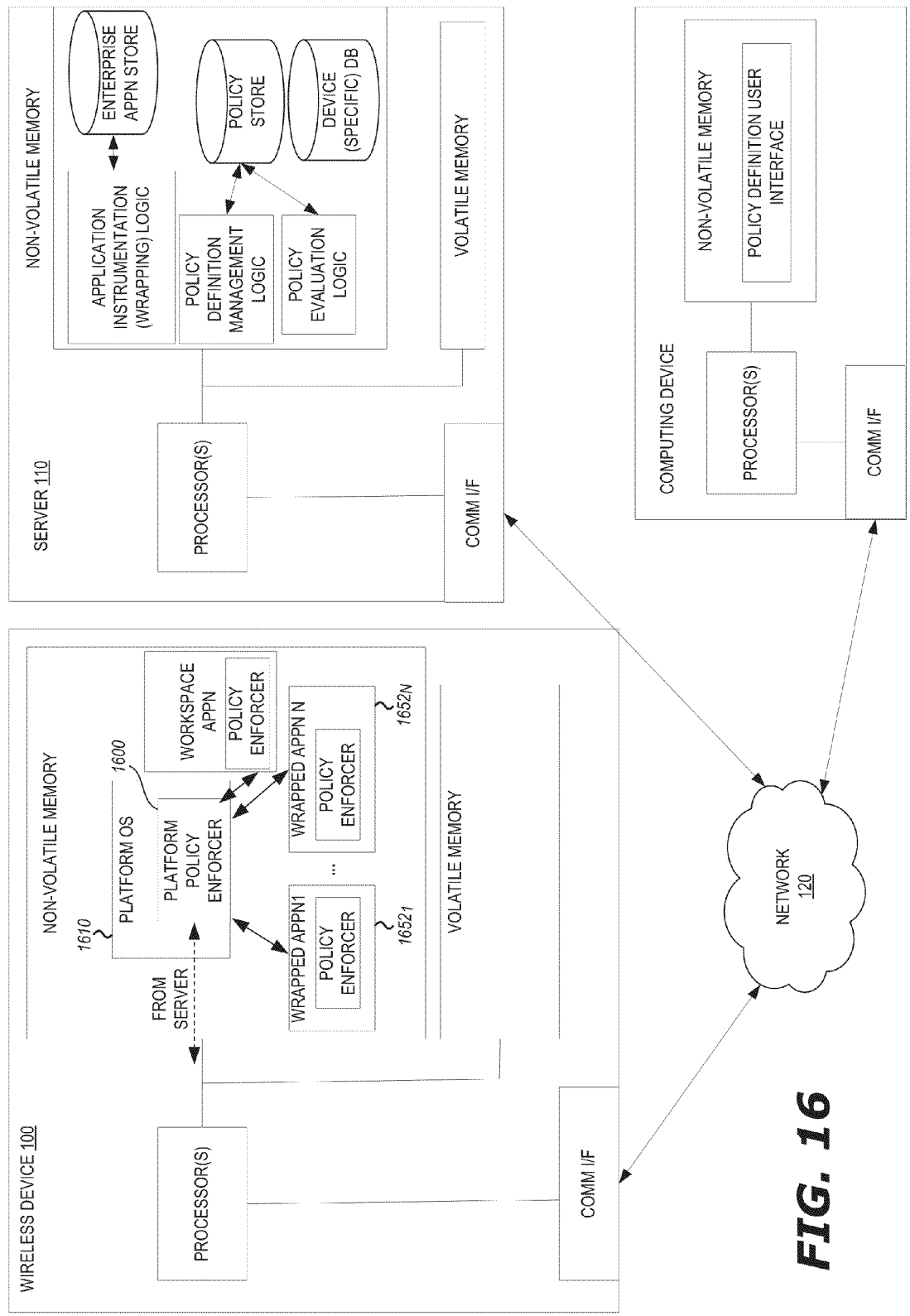
FIG. 16 is an exemplary block diagram of policy enforcer logic implemented within an operating system (OS) of the wireless device for centralized policy control of the workspace application and one or more wrapped applications in contrast to the policy enforcement scheme of FIG. 2.

Referring to FIG. 16, an exemplary block diagram of policy enforcer logic 1600 implemented within an operating system (OS) 1610 is shown. Platform policy enforcer logic 1600 provides a centralized policy control for the workspace application and one or more wrapped applications in contrast to the localized policy enforcement scheme of FIG. 2. More specifically, as set forth in FIG. 2, user-space virtualization in the form of a policy enforcer is injected in the applications as part of the wrapping process. Alternatively, as shown in FIG. 16, a similar platform-specific security policy is provided, where the policy enforcer that is available to applications operating on the platform.

Herein, platform policy enforcer 1600 is adapted to communicate with a server and receive policies. Platform policy enforcer 1600 could also be configured to communicate with a single security policy server or multiple policy servers.

Herein, wrapped applications $1652_1$-$1652_N$ need explicit privileges to use and to be able to communicate with platform policy enforcer 1600. All applications belonging to a workspace are granted the privilege to communicate with each other and no application outside the workspace. The privilege is granted by submitting the wrapped application to the platform provider (e.g., OS provider such as Apple for iOS® platform or Google for Android®-base platform) for the privilege grant.

Wrapped applications are hosted on server 110 and provisioned to wireless device 110 during enrollment (registration). Thereafter, platform policy enforcer 1600 controls the workspace application and all wrapped applications that belong to the workspace. Platform policy enforcer 1600 fetches the security policies from server 110, perhaps on a periodic basis, and applies such security policies to each of the workspace applications installed on wireless device 100.

Application upgrades may be accomplished the same way as described above. Application provisioning is accomplished by platform policy enforcer 1600 determining that a new application has been added to the workspace and that application has to be installed on the device. Upon such determination, platform policy enforcer 1600 simply requests server 110 for the wrapped application and its non-executable files, which are downloaded as the application bundle for subsequent installation.

According to this embodiment, application de-provisioning does not require the cleanup application as the policy enforcer. Rather, platform policy enforcer 1600 can simply uninstall the wrapped application automatically. Similarly, since platform policy enforcer 1600 has access to data associated with each wrapped application, an application-specific data wipe can be conducted by issuing a system request to wipe off the data of any workspace application.

K. Network and Internet Access Controls

Each wrapped application running in the workspace may be configured by its policy enforcer to control the application from going to certain Internet Protocol (IP) addresses, universal resource locator (URL) addresses, hostnames, etc. Furthermore, allowable network and internet traffic may further be controlled by routing it over a proxy to a specified IP gateway, may redirect, or may tunnel traffic over a virtual private network (VPN) tunnel. As discussed in greater detail below, the policy enforcer of a wrapped application may intercept certain system calls, and apply the controls as security policies.

Figure 17:
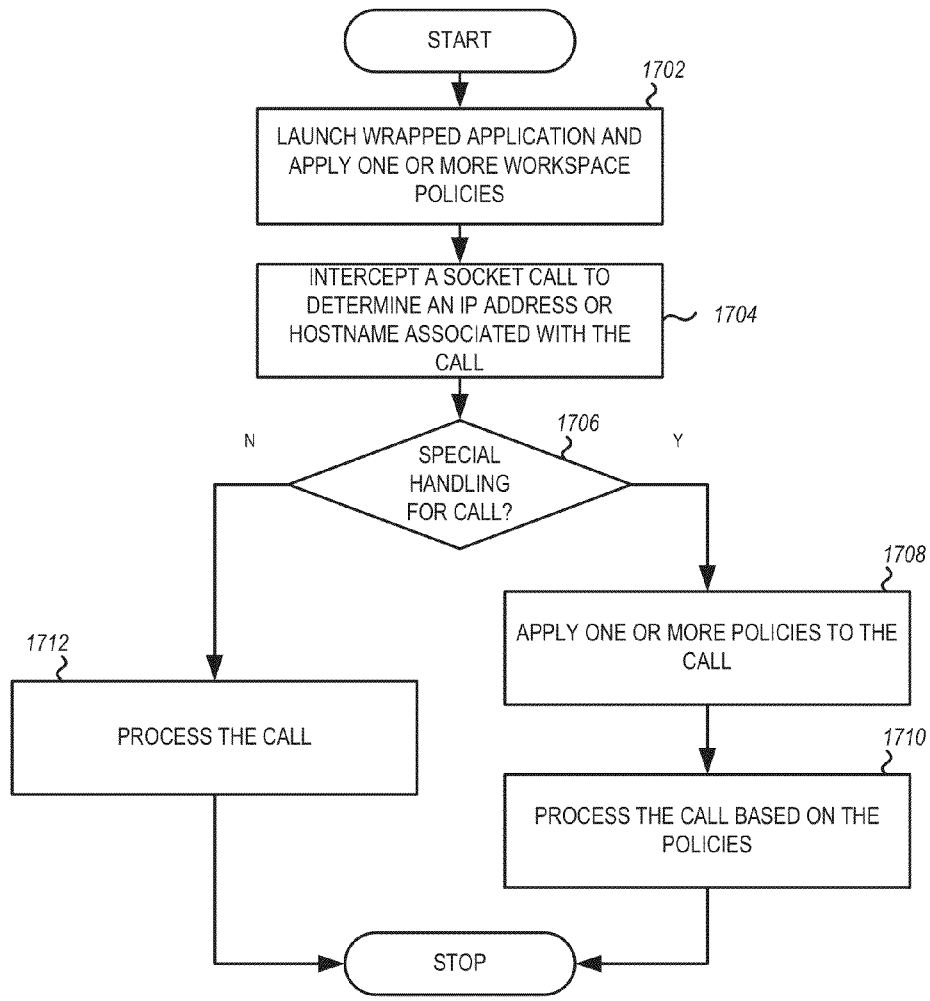
FIG. 17 is an exemplary flow diagram of the operations for controlling network and internet access.

As shown in FIG. 17, a wrapped application is launched and one or more policies are applied to the application via the application's policy enforcer (block 1702). As discussed above, when the wrapped application is launched, the application's policy enforcer fetches current security policies. These policies, as discussed below, may include policies directed to which website the wrapped application may access, what network resources the wrapped application may access, what controls are to be applied on network access and communication by the wrapped application etc.

Socket calls relating to network communication are intercepted by the wrapped application's policy enforcer to determine an IP address, hostname, network location, website, type of network communication, etc. being attempted by the wrapped application (block 1704).

The policy enforcer, which as discussed herein includes the most recent policies pushed or pulled to the policy enforcer from server 110, utilizes the policies embedded in the policy enforcer to determine if there are any special controls for handling the call (block 1706). In one embodiment, each socket call made within the wrapped application is checked against the configured policies in the applications policy enforcer to determine whether the IP address, hostname, website, etc., which is the subject of the socket call, matches any policy. When the socket call does not match a policy, the call is processed (block 1712). However, when the socket call does match one or more policies, one or more of the policies are applied to the call (block 1708) to enforce the one or more matched polices when the call is processed (block 1710).

As an exemplary policy that may be applied by a wrapped application's policy enforcer to the processing of a network and/or internet call, the call may be rerouted according to one or more policies. When the call is to be rerouted, the IP address or hostname in the intercepted socket call is changed to the IP address or hostname in the security policy. The security policy may then be used by a wrapped application's policy enforcer to process the call according to one or more policies.

The interception of an IP address or hostname in a socket call may also be used by a wrapped application's policy enforcer to apply a VPN tunneling policy. If the IP address and/or hostname in the socket call is associated with a policy that enforces traffic tunneling over a VPN, the policy enforcer may process the socket call by establishing a local loopback server to receive the socket call. A new VPN tunnel may then be created by the policy enforcer with the configured VPN gateway to receive the data packets from the local loopback server, and tunnel the traffic over the established VPN. Furthermore, tunnels may be established on a per-application basis, so that each application may use its own VPN gateway. Additionally, for wrapped applications whose policy enforcer is configured for a corporate VPN, domain name system (DNS) calls may also be intercepted by the policy enforcer, and sent to a DNS server behind the VPN gateway for resolving hostnames defined on a corporate network.

Similarly, interception of a call to access a URL addresses may also trigger a wrapped application's policy enforcer to control access to specific websites. URLs that should be blocked by wrapped application may be specified with the policy definition user interface logic 295 discussed above in FIG. 2. Optionally, the blocked URLs may also include a specification of one or more reasons why access to the URLs are blocked, and/or a custom webpage to be displayed to a user when the URL is blocked. As discussed above, these policies include the enforcement mechanisms (i.e., the blocked URLs, and associated reasons and/or custom web pages) that are pushed or pulled to the policy enforcers of wrapped applications. A policy enforcer of a wrapped application may then create a local loopback server for each blocking reason, and launch the local loopback servers when the wrapped application is launched. Then when the wrapped application attempts to access the blocked URL, the call can be intercepted, resolved to the hostname of the corresponding local loopback server, and the appropriate policy enforced. The enforcement of the policy may include rewriting the requested (blocked) URL with a new URL to custom web page and/or the reasons why the blocking has occurred. Each local loopback server may be configured to handle a separate code corresponding to the reasons a URL was blocked.

Furthermore, for secure socket layer (SSL) or transport security layer (TLS) web page request to be blocked, the policy enforcer of a wrapped application may establish a corresponding SSL or TLS local loopback server. In this case, the policies may be enforced by a wrapped application's policy enforcer as discussed above. However, the wrapped application must also perform the typical SSL or TLS handshake with the local loopback server, including creating a key pair for the SSL and TLS handshake.

L. Online Applications

Instead of enforcing certain policies as to what websites a user may visit, what network resources a wrapped application can access, etc. as discussed above, a wrapped application's policy enforcer may be configured to make certain workspace or wrapped applications "online applications." An online application is a wrapped application with one or more a policies that, when enforced by the wrapped application policy enforcer, ensure the wrapped application is only available to a user when device 100 is online and connected to server 110. Such an online application policy may be valuable, for example, in circumstances where up-to-date policies are essential for data loss prevention reasons, where the online application is only to be used when connection with an enterprise server is available, etc.

Figure 18:
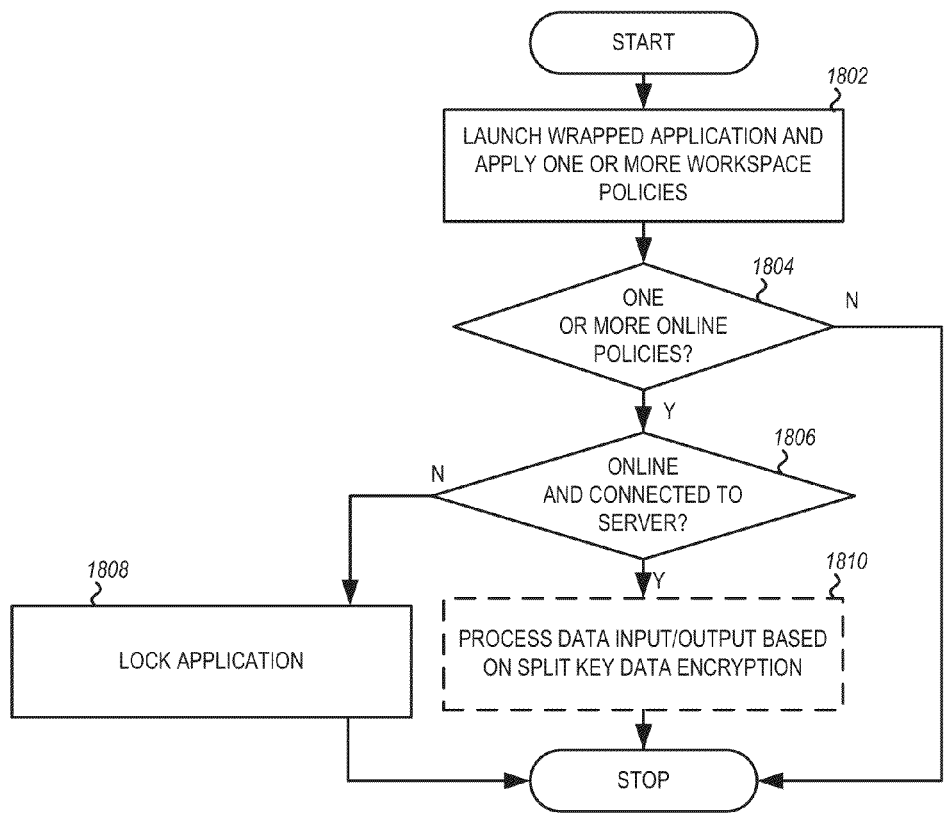
FIG. 18 is an exemplary flow diagram of the operations for enforcing an online application security policy.

With reference to FIG. 18, a wrapped application is launched and one or more policies are applied to the application via the application's policy enforcer (block 1802). One of the policies may be a policy that, when enforced by the wrapped application's policy enforcer, determine whether the wrapped application is subject to an online application policy (block 1804). When a wrapped application is not subject to an online application policy, the process ends.

However, when the wrapped application is subject to an online application policy (block 1804), the policy enforcer of the wrapped application checks to determine whether the device is online and connected to server 110 (block 1806). When the device is either not online or not connected to the server, the application is locked (block 1808), as discussed above. When the device is online and connected to server 110, the wrapped application's policy enforcer does not lock the application thereby enabling the application to be run. Optionally, as illustrated in dashed line, the wrapped application's policy enforcer may additionally enforce a split key-based data encryption scheme on all data read, written, or otherwise manipulated by the wrapped application (block 1810). As will be discussed in greater detail below, split key-based data encryption requires an application to be online. Since data that is subject to system read, write, etc. calls is encrypted with the split key, the wrapped application will only be able to access (e.g., decrypt) application data when online.

M. Network Policy Enforcement Based on Application Context

In the embodiments discussed herein, where a workspace application and/or wrapped application communicates over an enterprise network, data traffic generated by those workspace and/or wrapped applications may be given special treatment on the enterprise network. That is, identification of the context associated with a device (e.g., device 100), such as identifying to the enterprise network that the device is running a workspace related to the enterprise, enables the enterprise network to enforce network polices with respect to the device, such as ensuring a minimum quality of service for data traffic to or from the device over the enterprise network.

Figure 19A:
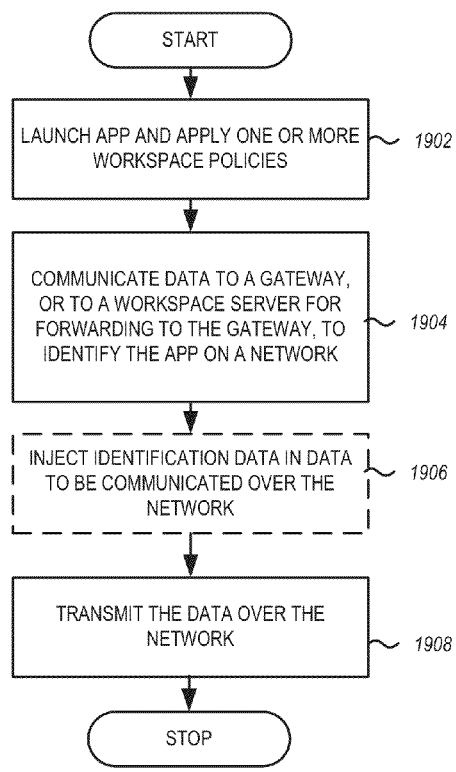
FIG. 19A-19B are exemplary flow diagrams of the operations for network policy enforcement by an enterprise based on application context.

Referring to FIG. 19A, a workspace application, or alternatively a wrapped application, identifies itself to an enterprise network to enable an enterprise network to enforce network policies. A workspace or wrapped application is launched and one or more policies are applied to the application via the application's policy enforcer (block 1902). The workspace or wrapped application then communicates data to a gateway, or to a workspace server for forwarding to the gateway, to identify one or more of a device, the workspace, or wrapped application to the network (block 1904). The identification may include the device's MAC address, an IP address associated with the device, an assigned IP address from a VPN tunnel, port information, a unique identifier associated with a user of the device, a unique identifier for the workspace application, a unique identifier associated with a wrapped application, etc. The various forms of identification enable network policies to be enforced by an enterprise for a device, for a workspace, and for individual applications. As will be discussed in FIG. 19B, the identification enables a gateway on an enterprise network to enforce network polices with respect data traffic to or from the workspace or wrapped application based on the received identifier. The identification may optionally be injected into data packets (block 1906), such as into a header, metadata, or other field of the data packet. The optional injection of the identification into specific data packets enables network policies to be enforced against individual wrapped applications that originate the data, as opposed to network policies applied to a device based on the device's MAC address. Those data packets are then communicated over the network (block 1908).

Figure 19B:
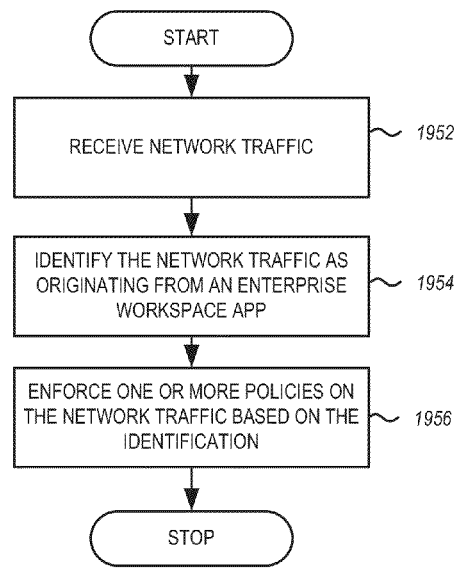

Now referring to FIG. 19B, an enterprise network gateway receives network traffic, such as packets of data (block 1952). In alternative embodiments, other network devices, such as routers, switches, etc. may be configured to, or be controlled to, enforce the network policies. The gateway identifies the network traffic as originating from a workspace application or wrapped application that is associated with the enterprise (block 1954). For example, the gateway may compare the MAC address in data packets with the MAC address of enterprise devices in order to determine if the device should be given preferential treatment on the network. Similarly, the gateway may attempt to extract identifier(s), which were embedded in data packets as discussed above, in order to determine if the device should be given preferential treatment on the network, and to further enforce per-application and/or per-user policies. The gateway may then enforce one or more network policies, such as ensuring a minimum quality of service, data rate, network asset access, etc., on the network traffic based on the identification (block 1956).

N. Workspace Application and Wrapped Application Single Sign on

Single sign on (SSO) capabilities refer to a user entering credentials to access a secure asset, and then being able to later access secure assets, without having to re-enter user credentials. Such a capability is typically provided by a web browser used to access a website, whereby, the first time the user authenticates against a website, a SSO token is sent to the user's web browser from an authentication process, such as a token generated from a multi-server authentication, authorization, and accounting (AAA) process. When the user visits another website in the web browser that requires authentication, and is configured to use the token, the user's web browser may simply present the second website the token rather than having to resupply their credentials. Such a system, however, relies on a web browser, and token management provided by the web browser.

In one embodiment, wrapped application running in a workspace that require authentication may automatically authenticate a user without prompting the user to enter credentials, subsequent to an initial authentication. The wrapped application SSO capabilities may be provided with a shared data store 235, as discussed below in FIG. 20, or without a shared data store, as discussed below in FIG. 21.

Figure 20:
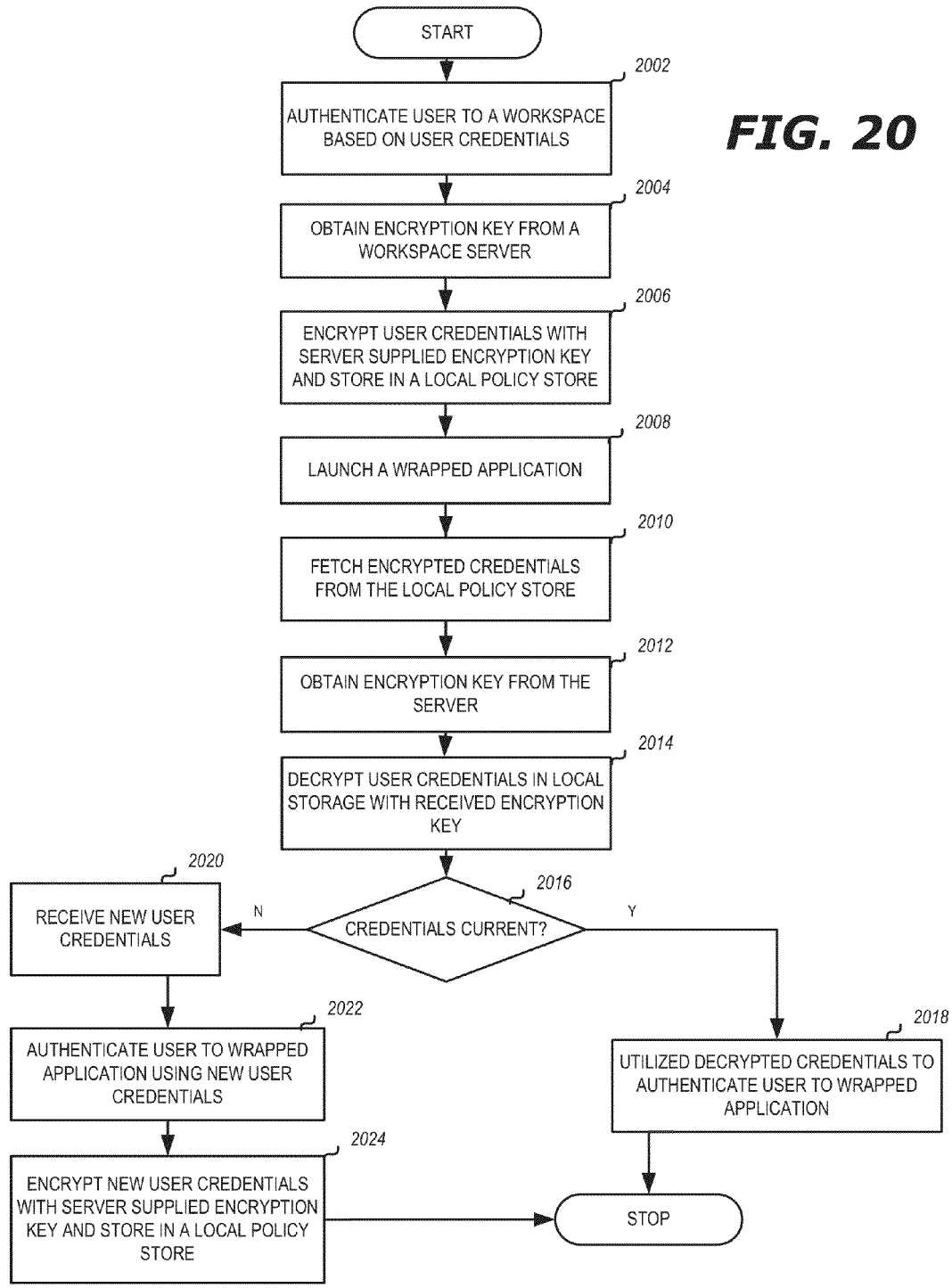
FIG. 20 is an exemplary flow diagram of the operations for one embodiment of workspace and wrapped application single sign on for user authentication.

With reference to FIG. 20, a wrapped application single sign on process, with a shared local policy store, is described. In the discussion of FIG. 20, workspace application 240 and wrapped applications $250_1$ through $250_N$ running in the workspace, have access to the shared data store 235. When a user initially launches the workspace application, she is authenticated based on user credentials, such as a username and password (block 2002). The workspace, upon successful user authentication, requests an encryption key from server 110 (block 2004). This key is used to encrypt the user credentials, which are then stored in the shared data store 235 (block 2006). The key, however, is only stored in volatile memory long enough to encrypt the user credentials. Thereafter, the key is erased, or otherwise removed, from volatile memory.

A wrapped application is then launched by the user, which requires user authentication (block 2008). Instead of prompting the user to re-authenticate herself, the wrapped application fetches the encrypted credentials from the shared data store (block 2010) and obtains the encryption key from the server 100 (block 2012). The wrapped application utilizes the encryption key to decrypt the encrypted user credentials stored in shared data store (block 2014), and further checks whether the decrypted user credentials are current (block 2016). When the decrypted user credentials are current, the wrapped application uses the decrypted and current user credentials to authenticate the user to the wrapped application (block 2018). However, when the decrypted user credentials are not current, the wrapped application receives new user credentials (block 2020) and authenticates the user to the wrapped application based on the new credentials (block 2022). The wrapped application then encrypts the new user credentials with the server supplied encryption key, and replaces the out of date encrypted user credentials in shared data store with the current encrypted version of the user credentials (block 2024). Although not illustrated, when the workspace application is closed on wireless device 200, or a user logs out of the workspace application, the stored encrypted user credentials are deleted from the shared data store.

Wrapped application provided by a public application store (i.e., iTunes®, Android App Store®, etc.) do not have the same access to the shared data store on device 100, as discussed above. Thus, such publicly distribute applications, although wrapped, cannot use the SSO technique discussed above in FIG. 20. In one embodiment, in order to provide a SSO experience for publicly distributed wrapped applications, a shared data store, similar to shared data store 235, is hosted on an authentication server for publicly downloaded applications. In one embodiment, server 110 may be the authentication server, although other servers that provide authentication services could also be used in accordance with the discussion below.

Figure 21A:
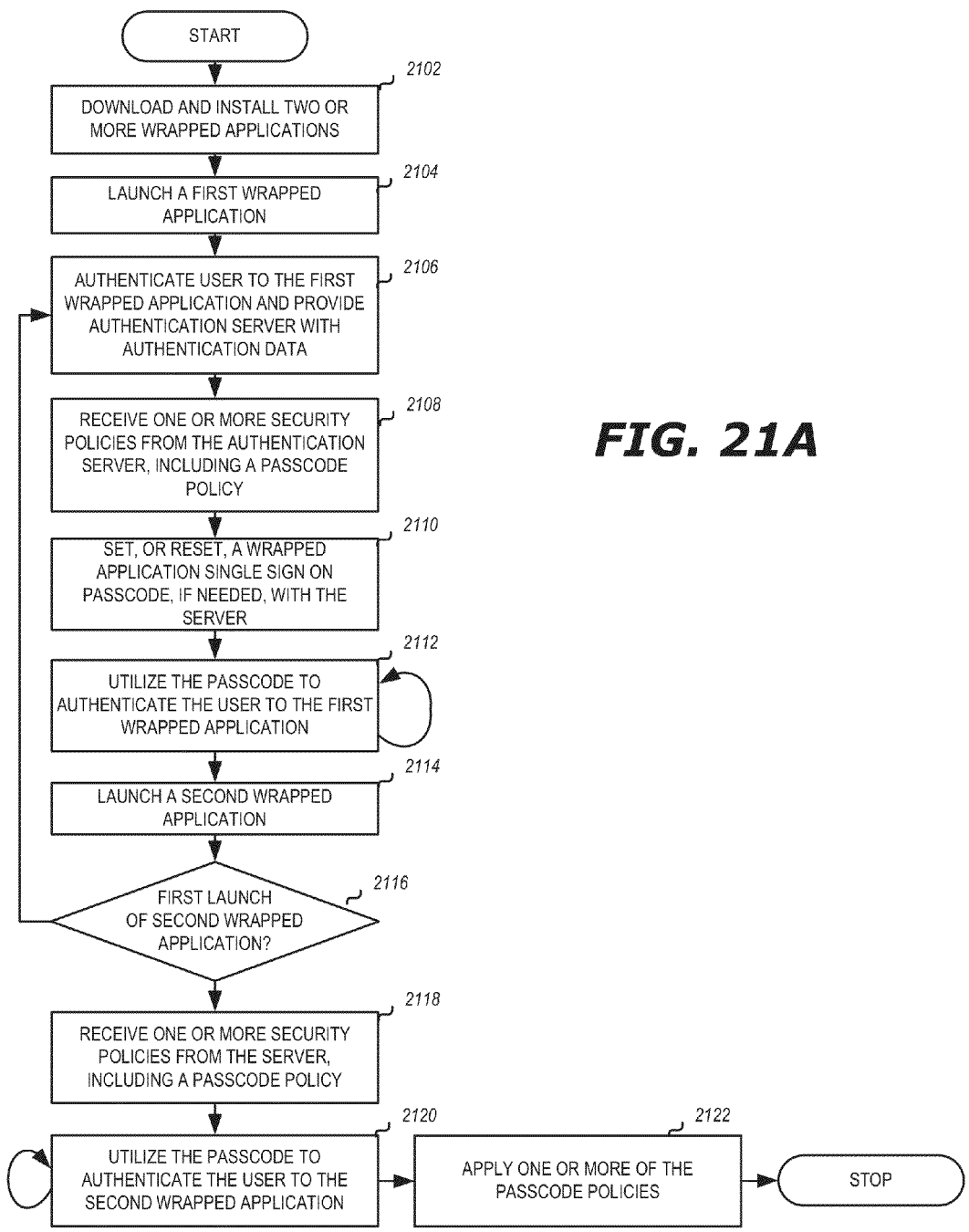
FIGS. 21A-21B are exemplary flow diagrams of the operations for another embodiment of workspace and wrapped application single sign on for user authentication.

With reference to FIG. 21A, at a wireless device, a user downloads and installs two or more wrapped applications from a public application store (block 2102), and launches a first wrapped application (block 2104). The first wrapped application authenticates the user based on user supplied credentials and provides the authentication data to an authentication server (block 2106). The authentication data provided to the authentication server include, at least, the user credentials, a device identifier (e.g., the MAC address of device 100), and the first wrapped application's unique identifier.

Figure 21B:
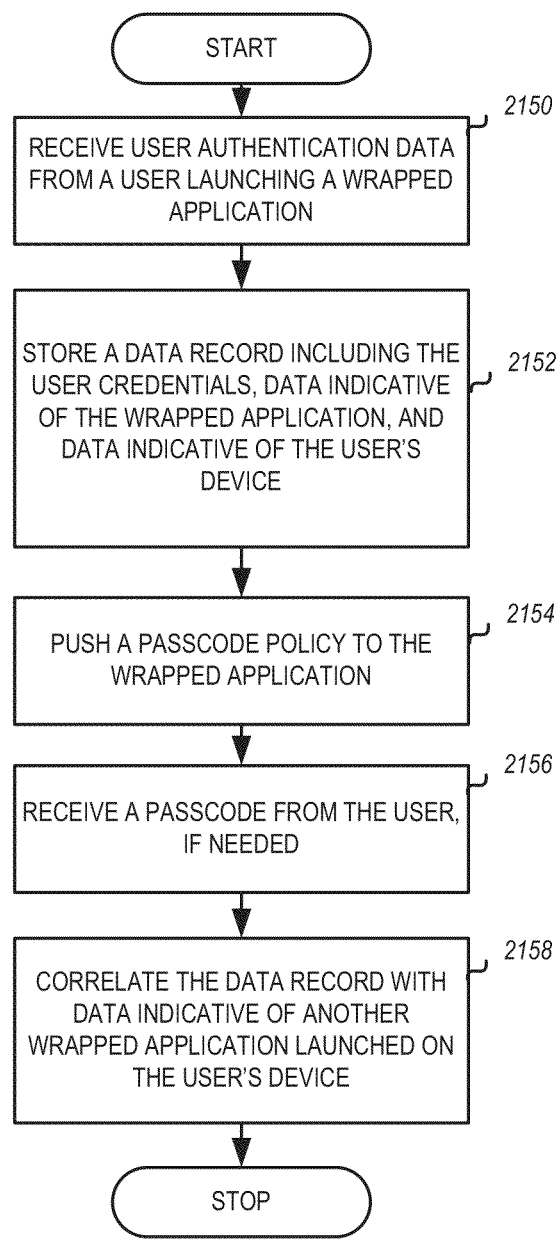

Now, with reference to FIG. 21B, at an authentication server, such as a server 110, a AAA server, etc., the user authentication data, including at least the user credentials, a wrapped application identifier, and a device identifier, are received (block 2150). A data record is created in the server side shared data store, the record including the user credentials, data indicative of the wrapped application, and data indicative of the user's device (block 2152). One or more passcode policies are pushed, as discussed above, to the wrapped application (block 2154). As will be discussed in greater detail below, the passcode policies may include a user's current passcode, and policies that enable the wrapped application to utilize the passcode. However, if needed, for example when no passcode exists for a user associated with the identified device, the authentication server receives a passcode from the user (block 2156) and correlates the received passcode with the data record for the wrapped application, as well as other wrapped application associated with the user and device (block 2158). As discussed in FIG. 21B, the authentication server stored a data record that correlates user credentials for different wrapped applications with a common passcode. This common passcode may be provided to wrapped applications running in a workspace, to enable the wrapped applications to authenticate a user via the passcode, rather than user credentials, as discussed below.

Returning to FIG. 21A, the passcode policies pushed by authentication server at block 2154 of FIG. 21B, are received at block 2108 of FIG. 21A. The passcode policies may include a previously established common passcode, policies that enable the first wrapped application to authenticate the user based on the passcode, or a policy that indicates to the first wrapped application that a new common passcode is needed (block 2110). Then, whenever the user selects the first wrapped application, the user may authenticate herself to the first wrapped application with the passcode (block 2112), and not her full user credentials.

A second wrapped application is then launched (block 2114), and a policy enforced by the second wrapped application determines if this is the first time the second wrapped application has been launched (block 2116). When the second wrapped application is launched for the first time, the user must again authenticate herself to the second wrapped application, transmit authentication data (for the second wrapped application to the authentication serve), and receive the passcode policies from the authentication server at the second wrapped application.

However, if the user has previously launched the second wrapped application, and has provided authentication data for the second wrapped application (i.e., the authentication server has stored user credentials for the second wrapped application), the second wrapped application first fetches and applies one or more security policies, including any passcode policies (block 2118). The passcode, previously established by the user, may then be used to authenticate the user to the second application (block 2120). The second wrapped application then utilizes the passcode to obtain and apply one or more of the passcode policies, such as fetching and applying the stored user credentials correlated to a user, device, and wrapped application at the security server, to the second wrapped application as a security policy enforced by the second wrapped application's policy enforcer (block 2122).

As discussed above in FIGS. 20, 21A, and 21B, the workspace application and wrapped applications enable the user to have a SSO experience, without relying on a web browser, or a AAA authentication service.

O. Secure Workspace Authentication

Since a device, such as wireless device 100, may have several unwrapped applications and several wrapped applications, which are run in a workspace as discussed above, it is possible to have multiple versions of the same application running on the same device. For example, the same application may be run on a device in wrapped and unwrapped form. As another example, two different users of a device may have access to the same workspace and application, but use different credentials to access the application. Since multiple instances of the same application, wrapped and unwrapped, could be running on a device 100, as discussed below in FIGS. 22A and 22B, a multiple layered authentication method is used to ensure that only the wrapped application for a given user in a given workspace has access to the corresponding user-application-workspace data available on a remote workspace service (e.g., a remote data store, enterprise network, etc.). In one embodiment, as discussed below, the multiple layered authentication for a given user, wrapped application, and workspace utilizes at least a device identifier, a workspace certificate, and user credentials when attempting to access the remote workspace service.

Figures 22A, 22B:
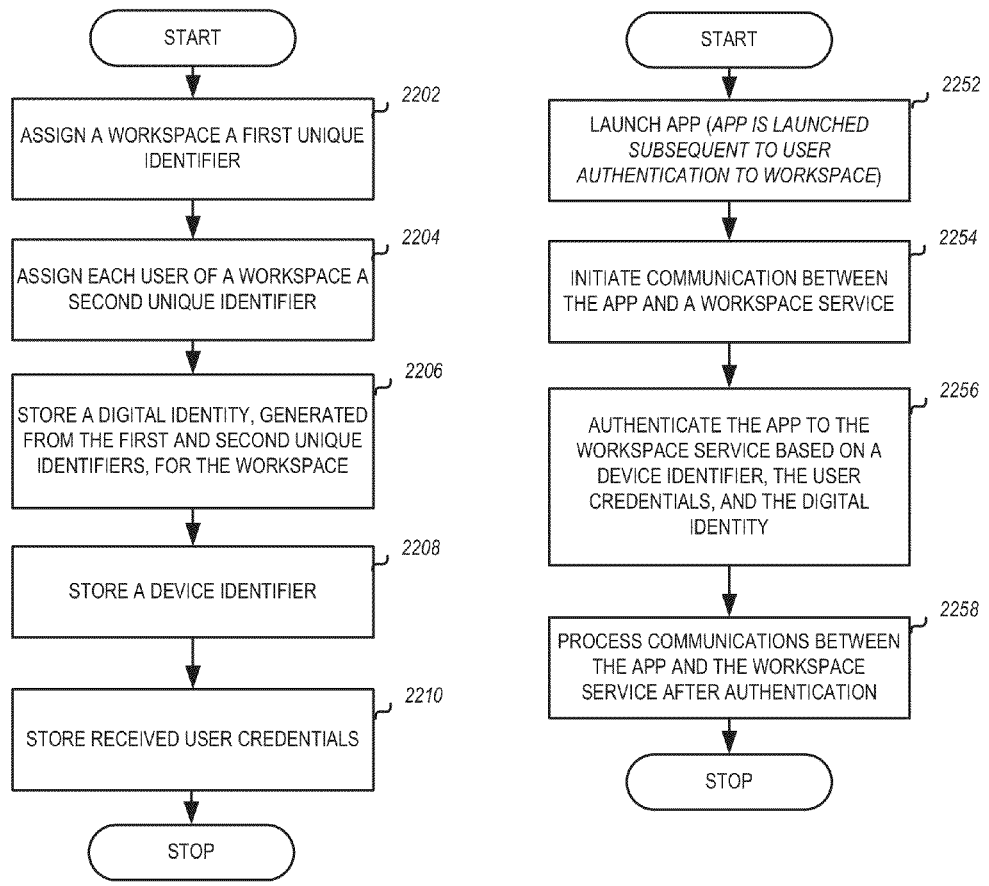
FIGS. 22A-22B are exemplary flow diagrams of the operations for multi-layered workspace authentication.

With reference to FIG. 22A, the identification data utilized for multiple layered workspace authentication are generated. A workspace is assigned a first unique identifier (block 2202). When a workspace is provisioned for multiple users on a single device, each workspace instance is assigned a unique identifier for each different user. Each user is also assigned a unique identifier (block 2204). The unique workspace identifier and unique user identifier may then be combined and stored as a digital identity for the workspace (block 2206). In one embodiment, the digital identity is stored at a remote workspace service accessible to a wrapped workspace application. A device identifier, such as a MAC address, and user credentials are also stored (block 2210). In the described embodiment, the three items of authentication data enable a remote workspace service to ensure that a specific device, specific instance of a workspace, and a specific user is the only combination of device, user and workspace that may access the data provided and secured by the remote workspace service.

In order to access the data or services provided by the remote workspace service, with reference to FIG. 22B, a wrapped application is launched from a workspace of a device (block 2252). It should be noted that since the wrapped application is being launched from the workspace, it is assumed that a particular user has already authenticated herself to the workspace. Communication is then initiated between the wrapped application and the remote service (block 2254) so that the wrapped application can authenticate itself to the remote workspace service based on a device identifier for the device, the user credentials used to authenticate the user to the workspace, and the digital identity (i.e., the combination of the unique workspace identifier and user identifier) (block 2256). The remote workspace service may then processes transactions for the wrapped application after successful authentication (block 2258).

P. Secure Workspace File Storage

As discussed herein, wrapped applications include policy enforcers to enable compliance with one or more security policies. Previously, those policies have focused on securing the interaction between a workspace, a workspace application, and wrapped applications. As discussed below, reading, writing, opening, or otherwise accessing data in storage, whether via regular or memory-mapped data access functions, may also be protected by policy enforcers.

In one embodiment, a regular file function is a system call by a wrapped application to open, read, write, close, stream (e.g., fopen, fscanF, fprintF, fget), etc. files in storage via access to the files themselves. A memory mapped file function is a system call by a wrapped application to map, unmap, deallocate, synchronize, control, etc. for accessing files in storage via a pointer. Policy enforcement to secure both regular and memory mapped file access will be discussed below.

Figure 23:
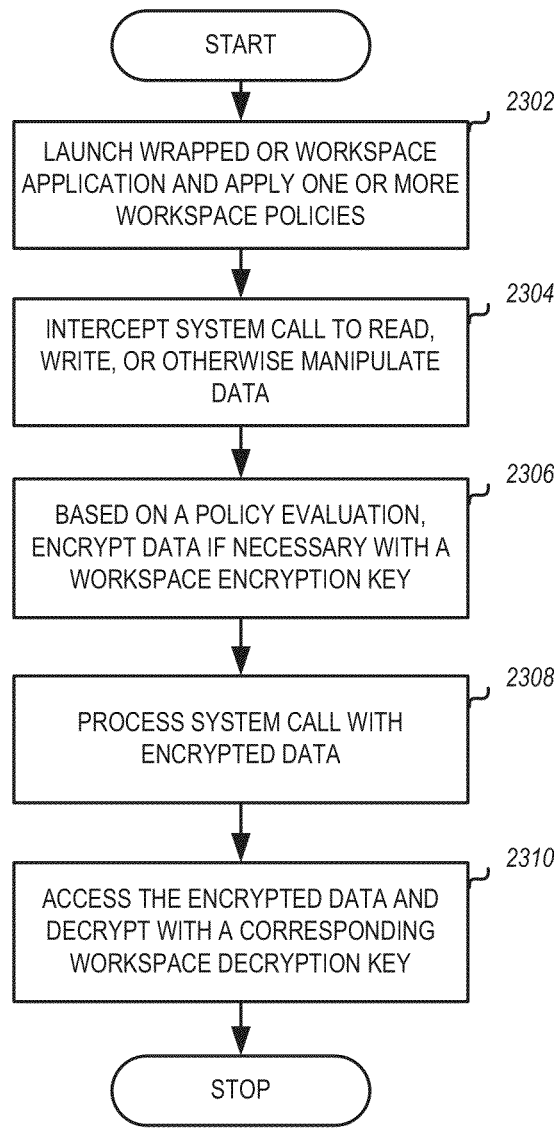
FIG. 23 is an exemplary flow diagram of the operations for securing regular and memory-mapped file access functions.

With reference to FIG. 23, a process for securing files accesses by a workspace or wrapped application is described. A workspace application or wrapped application is launched, and one or more workspace policies are enforced by the launched application's policy enforcer (block 2302). The policy enforcer, via techniques such as "method swizzling" discussed above, intercepts various system calls to access data (block 2304). The system calls may be regular file functions to read, write, or otherwise manipulate files stored on a wireless device, such as wireless device 100. The system calls may also be memory mapped file function calls, such as mmap, munmap, vm_deallocate, msync, fcntrl, fsync, truncate, ftrucate, etc. to access files in storage via a pointer.

Based on one or more workspace policies enforced by a policy enforcer of the application attempting to access the file, the data which is subject to the system call may be encrypted with a workspace encryption key (block 2306). In one embodiment, the encryption key may be a key accessible to, and shared by, all applications in a workspace when there is a file exchange between applications. In another embodiment, the encryption key may be an application-specific encryption key when there is no file exchange. In yet another embodiment, the encryption key may be a split encryption key, as discussed in greater detail below. In yet another embodiment, the encryption key may be maintained on a per-directory basis for files in memory.

The system call is then processed with the encrypted data using functions of the policy enforcer (block 2308). The processing of system calls for both regular and memory mapped file functions by the policy enforcers is discussed in greater detail below. However, as an example of processing a regular file access system call, when a system call is issued by a wrapped application to read a file from storage, and if the file is to be encrypted, a policy enforcer system call creates an instance of a data structure that is maintained for the file, and encrypts the file with a workspace key. The data structure may then store the encrypted file, and in one embodiment, the encryption key and context data. The encrypted file may then be accessed and decrypted with a corresponding workspace decryption key (block 2310).

For information stored locally on a device, such as wireless device 100, by workspace or wrapped applications, a policy enforcer may take one or more steps to secure the files with regular (i.e., non-memory mapped) operation system calls. As discussed above in FIG. 23, system calls by a workspace or wrapped application, such as open, read, write, and close are intercepted by a policy enforcer. Similarly, streaming file input/output functions, such as fopen, fscanf, fprintf, fgets, etc. may also be intercepted. A non-exclusive list of file access operations secured by the policy enforcer includes:

a) open—intercept open system call. Create instance of data structure per file handle, store file, encryption key, and context in the data structure. However, if it is detected that the context is still active for the file handle that is the subject of the open system call, it is freed before allocating a new one;
b) write—intercept write system call, encrypt data, and then write file to memory;
c) close—intercept close system call, free encryption context and other data structures associated with the closed file; and
d) read—the data is read from memory, decrypted, and then provided to the requesting workspace or wrapped application.

Additional file access operations may be intercepted, and handled, in accordance with the discussion herein. For example, when files are to be exchanged between a workspace and/or wrapped applications, the call to pass a file between the applications is intercepted. The file name is then passed to a directory where the file can be stored and encrypted by a common encryption key available to workspace and/or wrapped applications. The call may then be processed with the new filename where the file is encrypted with the common key. In one embodiment, the new filename includes a prefix added to the filename to indicate that the file is encrypted. Then for the receiving workspace or wrapped application in the file exchange, the function call to access the file is also intercepted, decrypted using the common key and copied to the memory for the receiving application with the original filename (i.e., without the prefix), and the receiving application can then access the file with the original access function.

Although similar to the discussion above, the securing and handling of memory mapped files by policy enforcers is discussed below. That is, in memory mapped file access operations, the operations are performed with respect to a pointer to the file. To complicate this further, for the same file descriptor, it is possible that a workspace or wrapped application can use regular system file access calls, and memory mapped system calls, at the same time. For memory mapped system calls by a workspace or wrapped application, in one embodiment, the following calls are intercepted: mmap, munmap, vm_deallocate, msync, fcntl, scync, truncate, ftruncate. Then, for example, when a function such has mmap is intercepted, a corresponding policy enforcer function processes the call.

Then in order to process the system call, as describe in FIG. 23, a signal bus call handler is installed for each policy enforcer, which intercepts the system calls and calls one or more policy enforcer file access functions to process the system call. For example, for an intercepted mmap system call, a policy_enforcer_mmap call is made on the file descriptor, a specified amount of address space is allocated by policy_enforcer_mmap, the mapping between the file descriptor to the address space is maintained, and the address space is marked as not-accessible. Additionally, if fseek or ftruncate go beyond a current size allocated for the file, additional bytes of 0 are written to the file after the encryption Furthermore, for memory mapped file access via the policy enforcer system calls, the signal bus handler will check a current protection setting for the file to be accessed, and upon detecting that the current state is not accessible for the operation (e.g., memory is not yet allocated), the signal handler will allocate the memory space, read the section of the file from memory, decrypt that section, and write the decrypted contents to memory. In one embodiment, the signal handler allocates 4 k bytes of memory for the file write.

The workspace or wrapped application may then continue if the memory mapped access was a read operation. When the memory mapped system call is attempting to write data, the signal bus handler will intercept this call, check current protections, and on detecting the current protection is read-only, will note that this specific page is dirty and map the page to be read-write. Then, as part of one or more sync functions, dirty pages are written to physical memory, after encryption, and those pages are marked as read-only again. Dirty page checks will also be done as part of one or more hooks when a workspace or wrapped application goes to the background.

When closing a memory mapped file by one or more policy enforcer system calls, if close is called before the unmap system call, the file descriptor is not actually closed. However, the file descriptor is marked for closure by the munmap and vm_deallocate policy enforcer system calls. Then when munmap and vm_deallocate are called, the file is closed as well.

In the signal bus handler, for memory mapped file access, if it is detected that a system call is raised for a situation other than file access that is processed by a policy enforcer system call, the system call is passed to the original (i.e., non-workspace) call handler. Furthermore, for the file descriptors, discussed above, that have memory mapped management, via policy enforcer system calls, all read, write, etc. calls are directed via memory access assuming a specific area in a file is memory mapped. If the read-write system call access is occurring on a section of the file that is not memory mapped, the system calls can be passed through after file encryption decryption.

As discussed herein, memory usage with the policy enforcer memory mapped file access system calls is the same as that of typical operating system kernel-based memory mapped calls. However, using the policy enforcer memory mapped file access system calls, page and file based management may, in one embodiment discussed above, be limited to 4 k worth of memory. This is beneficial for the limited resources associated with wireless device 100. Furthermore, dirty page may be efficiently detected in accordance with the discussion above. Additionally, data that is written to persistent memory is encrypted to further secure the data.

Q. Cloud-Based Storage for Workspace and Wrapped Applications

As discussed above, binary instrumentation for wrapped application enables system calls to be intercepted and processed by one or more functions of a policy enforcer. For example, for data input/output calls of a wrapped application, the data may be encrypted prior to storage to secure the data in mobile device's 100 memory, and then decrypted when read back from the memory. In one embodiment, such input/output calls may additionally be intercepted to enable cloud-based backup and cloud-based common storage for workspace and wrapped applications.

Figure 24A:
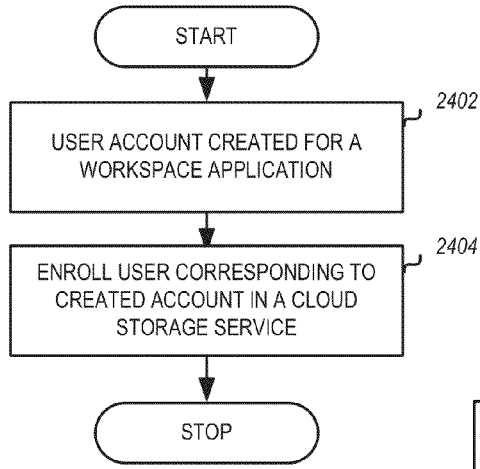
FIGS. 24A-24B are exemplary flow diagrams of the operations for automatically enabling data backup, storage, and sharing for workspace and wrapped applications at a cloud-based storage service.
Figure 24B:
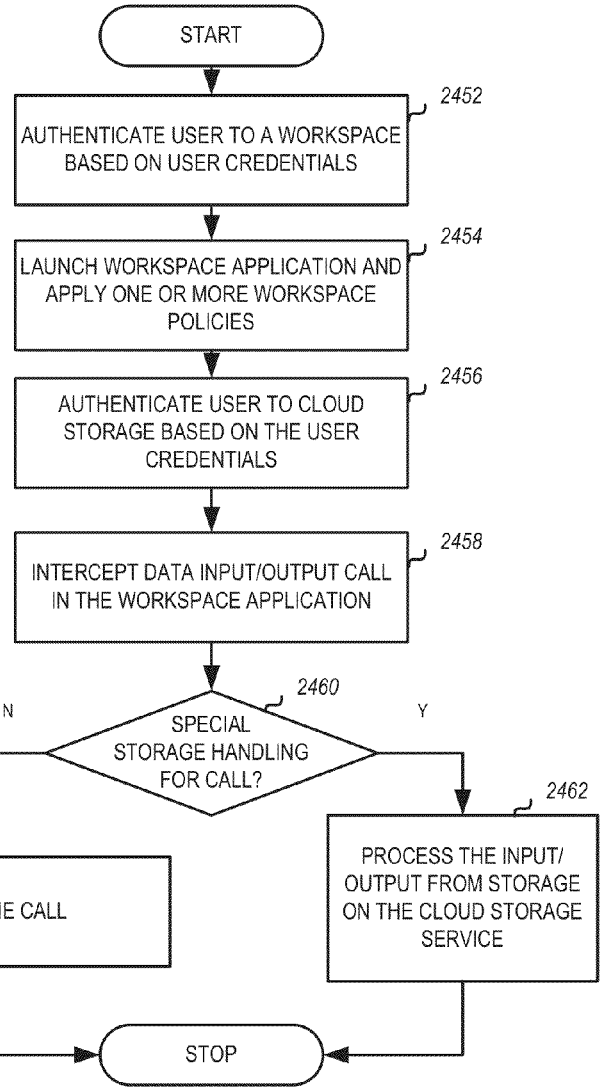

In order to utilize a cloud-based storage to backup or share data, in one embodiment, an account is created for a workspace application in FIG. 24A, and then the workspace application utilizes the account for cloud-based storage in FIG. 24B.

With reference to FIG. 24A, a user account is created for a workspace application at a cloud-based storage system (block 2402). The cloud-based storage system could be implemented by server 110, as well as other cloud-based storage systems. Furthermore, the cloud-based user storage account may be created automatically when provisioning a workspace, workspace application, or wrapped application. In another embodiment, the user may be required to access a registration service via a web page served for the cloud-based storage service. In either case, user credentials, as well as application identifiers (e.g., unique device, workspace, and wrapped application identifiers), are provided to the cloud-based storage system for identifying a particular device, user, and application to the cloud-based storage system. In embodiments discussed herein, the cloud-based storage may be partitioned for a user, for a specific workspace associated with the user, or for specific workspace or wrapped applications associated with user. The user is then enrolled for the services provided by the cloud-based storage system (block 2404).

Now referring to FIG. 24B, a user authenticates herself to a workspace based on user credentials (block 2452). A wrapped application is then launched by the users, and one or more workspace policies are applied by a policy enforcer of the wrapped application (block 2454). As discussed below, the policies may include automatically, and transparently, backing up data for the workspace application at a cloud storage service provider. The user credentials, as well as device, workspace, and wrapped application identifiers, may then be used to authenticate the user to the cloud storage system (block 2456). Use of the various identifiers enables the cloud-based storage system to maintain cloud storage for different levels of granularity (i.e., for a device, for a user, for a workspace, for a wrapped application). Furthermore, utilizing the single-sign-on techniques discussed above, a user could automatically be logged into the cloud-based storage service without having to explicitly do so. In one embodiment, the user's username and workspace certificate (which is common for each device associated with a user) may be used to automatically authenticate the user to the cloud-based storage system when her username and workspace certificate are presented during authentication into the workspace.

Similar to the discussion above, data input/output calls for a wrapped application are intercepted (block 2458), and a determination is made as to whether the data should be processed (e.g., written to, read from, synchronized with, etc.) cloud-based storage system. When the data input/output call does not invoke a cloud-based storage operation (block 2460), the system call is merely handled (block 2464) in accordance with the discussion above. However, when the data input/output call does invoke a cloud-based storage operation (block 2460), the data is processes in cooperation with the cloud-based storage system (block 2462). In one embodiment, when the calls are processed with respect to the cloud-based storage service, the location, which is marked as the user space at the cloud-based storage service, is recorded in the wrapped application's local storage. This indicates to the wrapped application where certain data exists, i.e. in the cloud.

For example, when a wrapped application at a mobile device, which is configured for cloud-bases storage, flushes data (e.g., application data, application configurations, etc.) so that the data is written to a local memory, the data input/output calls associated with the data flush are intercepted. Then the read, write, etc. calls may be sent to the cloud-based storage system to back up the data at the cloud in addition to local storage, or instead of local storage. When a wrapped application launches, the wrapped application's data read/write system calls may then access the cloud-based storage system to obtain the most recent version of cloud-based data. As a result, a user with an account at the cloud-based storage service, could use the service to access the most recent data, application configuration, running state, etc. for the same wrapped application on different devices.

In one embodiment, each wrapped application associated with a user may share a common storage space on the cloud-based storage system. The shared common storage may then be accessible to each enrolled device associated with the user. The shared common storage thus enables a user to maintain and backup all wrapped application-specific data at the location within the cloud-based storage service.

Furthermore, in accordance with the discussion herein, the cloud-based storage service could also be used to back up the running states of an entire workspace. Each wrapped application running in a workspace may back up their data, including configuration data, running state, etc. Furthermore, wrapped application may collectively back up their data when a workspace closes. Then, when the user later logs into the workspace, or accesses their workspace on a different device, the cloud storage data may be used to configure the workspace and wrapped applications to a current state, including current data.

To improve the efficiency of the cloud backup and storage, particular files could be indicated as being subject to cloud-based storage. For example, temporary files created and utilized by a wrapped application for a particular run need not be backed up. However, user data generated with the application and application configuration data could be indicated as being subject to backup at the cloud-based storage. By segregating files that should be stored and those that should not be stored at the cloud-based storage service, the download of wrapped application data when the wrapped application is launched, as well as the upload of data when the wrapped application is closed, require less time to complete.

R. Split-Key Encryption for Secure Data Storage

Mobile device 100 provides security for a workspace in the form of a security stack that originates from mobile device's 100 hardware, and through a chain of trust, extends to software. The chain of trust may be further extended and reinforced for workspace and wrapped applications in the form of policy enforcers, which ensure that only approved and/or allowed applications are run on the mobile device, based on one or more policies. However, if such a device is jailbroken, the chain of trust is circumvented, and previously inaccessible, and secret, data may become accessible and insecure. This raises great concerns for an enterprise In one embodiment, a split-key based encryption technique may be employed for workspace and wrapped applications to secure data, even against device jail braking. Furthermore, the split-key based encryption technique, discussed below, may further be used as a mechanism to enforce one or more workplace policies, such as for example, an online application policy. In the embodiments discussed below, the technique is referred to as a "split key" based technique because an encryption key, utilized by workspace and wrapped applications, is divided into multiple parts. A first part is encrypted with a device key, while a second part is encrypted with a server key. Furthermore, the workspace only stores the server key in volatile memory 232 long enough to perform an encryption operation on the second portion of the split key, but policy enforcers ensure that the server key is not permanently stored or accessible. Then, whenever a workspace or wrapped application desires to encrypt or decrypt data using the split key, the requesting wrapped application must both request the server key to decrypt the split key and authenticate itself to the server.

Referring to FIG. 25A, a process for generating a split key for use by a workspace or wrapped application to encrypt data is described. A workspace or wrapped application is launched, and one or more policies are applied to the application by a policy enforcer of the application (block 2502). As discussed above, data input/output system calls may be intercepted (block 2504), so that security policies may be enforced on the system calls. The data, which is the subject of the system call, may then be encrypted with a data storage encryption key (block 2506). The data storage encryption key may be a key that is unique to the workspace, shared among workspace and wrapped applications, unique to a particular application, unique to a particular mobile device 100, unique to a particular user, etc.

A symmetric encryption key is then used to encrypt the data storage encryption key (block 2508). This symmetric encryption key is then split (block 2510) into at least two parts. A first part of the split symmetric encryption key is encrypted with a key, which is based on user credentials, workspace credentials, etc. (block 2512). For example, the first part of the symmetric encryption key may be encrypted using password based encryption (PBE). The encrypted first part of the split symmetric encryption key may then be stored in shared data store 235. A second part of the split symmetric encryption key is then encrypted with a server encryption key (block 2514). In one embodiment, the server encryption key is requested by the wrapped application after successful user authentication to the server, and stored in volatile memory 232 just long enough for the wrapped application to perform an encryption operation on the second portion of the split key. The encrypted first part and the encrypted second part of the split symmetric encryption key may then be stored in shared data store 235.

With reference to FIG. 25B, a process for using a split key by a workspace or wrapped application to decrypt and access data is described. A workspace or wrapped application is launched, and one or more policies are applied to the application by a policy enforcer of the application (block 2552). Data input/output system calls may be intercepted with respect to data stored on wireless device 100 (block 2554). A user then authenticates herself based on one or more user credentials (block 2556), such as a username and password, passcode as specified in a passcode policy, etc. The first part of the split symmetric encryption key, which is stored in shared data store 235, is then decrypted with the encryption key based on user credentials (block 2558). Furthermore, the server key for decrypting the second part of the split symmetric encryption key may be requested from server 110, using the user credentials, and used to decrypt the second part of the split key (block 2560). The two decrypted parts of the split symmetric encryption key can then be joined (block 2562), and the encrypted data storage encryption key decrypted with the joined symmetric encryption key (block 2564). The decrypted data storage encryption key may then be used to decrypt the encrypted data, which is the subject of the intercepted system call (block 2566).

The data maintained in storage at wireless device 100, and secured by the encrypted data storage encryption key, may therefore only be accessed with both parts of the split symmetric encryption key. When a device is jailbroken, the mere access to the data is not enough to reveal the data, as the jailbroken device will not have the entire split encryption key in unencrypted form.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable medium comprising instructions which, when executed by one or more hardware processors, causes the one or more hardware processors to:

identify, by a particular user application, a first set of applications that a user has permission to access, the first set of applications being selected from a plurality of applications, and wherein each application of the first set of applications comprises a policy enforcer code that automatically applies one or more security policies to control behavior of the application;

provide, by the particular user application to a user, an option to select at least one application of the first set of applications;

receive, by the particular user application from the user, a request to access a first application in the first set of applications;

responsive to receipt of the request, cause, by the particular user application, the policy enforcer code in the first application to intercept system calls and framework calls on the first application and replace symbols for the intercepted system calls in an in-memory symbol table with predefined symbols and the framework calls with predefined calls to enable the policy encoder code to control behavior of the first application; and cause, by the particular user application, execution of the first application following interception and modification of the system calls and framework calls on the first application.

2. The non-transitory computer readable medium of claim 1, wherein the particular user application does not have kernel access for an Operating System executing on a same device as the particular user application.

3. The non-transitory computer readable medium of claim 1, wherein to provide the option to select at least one application of the first set of applications, the instructions are to cause the one or more hardware processors to:

determine a subset of applications from the first set of applications that the user has permission to access; and display at least one or more icons representing the subset of applications that the user has permission to access.

4. The non-transitory computer medium of claim 1, wherein to identify the first set of applications that the user has permission to access, the instructions are to cause the one or more hardware processors to at least one of:

determine, by the particular user application, whether the user has permission to access the first application based on a physical location of a device executing the particular user application as controlled by the policy enforcer code of the first application; and determine, by the particular user application, whether the user has permission to access the first application based on either (i) a network connection of a device executing the particular user application or (ii) a configuration of the device executing the particular user application.

5. The non-transitory computer medium of claim 1, wherein the instructions are to cause the one or more hardware processors to:

inject the policy enforcer code into a dynamic load library of the first application during a binary instrumentation of the first application, wherein the behavior of the first application after the binary instrumentation of the first application is different than a behavior of the first application prior to the binary instrumentation of the first application.

6. The non-transitory computer medium of claim 1, wherein to provide the option, the instructions are to cause the one or more hardware processors to:

display an interface comprising:

a first plurality of icons representing the first set of applications that the user has permission to access;

a second plurality of icons representing a second set of one or more applications that the user does not have permission to access;

wherein the interface indicates that (a) the first plurality of icons represents applications that the user has permission to access and (b) the second plurality of icons represents applications that the user does not have permission to access.

7. The non-transitory computer medium of claim 1, wherein the instructions are to cause the one or more hardware processors to, responsive to the identification of the first set of applications that the user has permission to access, install the first set of applications on a device executing the particular user application.

8. The non-transitory computer medium of claim 1, wherein the instructions are to cause the one or more hardware processors to:

subsequent to causing execution of the first application, determine a change in permissions associated with the user;

identify, by the particular user application, that the user does not have permission to access the first application based on the change in permissions associated with the user; and prevent, by the particular user application, the user from accessing the first application.

9. The non-transitory computer medium of claim 1, wherein the instructions are to cause the one or more hardware processors to:

identify, by the particular user application, a second set of applications that a second user has permission to access, the second set of applications being selected from the plurality of applications, and the second set of applications being different than the first set of applications;

provide, by the particular user application to the second user, an option to select at least one application of the second set of applications;

receive, by the particular user application from the second user, a second request to access a second application in the second set of applications;

responsive to receipt of the second request: cause, by the particular user application, execution of the second application.

10. A device comprising:

at least one hardware processor;

a memory on which stored instructions that are to cause the at least one hardware processor to:

identify, by a particular user application, a first set of one or more applications that a user has permission to access, the first set of one or more applications being selected from a plurality of applications and wherein each application of the first set of one or more applications comprises a policy enforcer code that automatically applies one or more security policies to control behavior of the application;

provide, by the particular user application to a user, an option to select at least one application of the first set of applications;

receive, by the particular user application from the user, a request to access a first application in the first set of one or more applications;

responsive at least to receipt of the request cause, by the particular user application, the policy enforcer code in the first application to intercept system calls and framework calls on the first application and replace symbols for the intercepted system calls in an in-memory symbol table with predefined symbols and the framework calls with predefined calls to enable the policy encoder code to control behavior of the first application; and cause, by the particular user application, execution of the first application following interception and modification of the at least one system calls and the framework calls on the first application.

11. The device of claim 10, wherein the particular user application does not have kernel access for an Operating System executing on a same device as the particular user application.

12. The device of claim 10, wherein to identify the first set of applications that the user has permission to access, the instructions are to cause the at least one hardware processor to at least one of:

determine, by the particular user application, whether the user has permission to access the first application based on a physical location of a device executing the particular user application as controlled by the policy enforcer code of the first application;

determine, by the particular user application, whether the user has permission to access the first application based on a network connection of a device executing the particular user application; and determine, by the particular user application, whether the user has permission to access the first application based on a configuration of a device executing the particular user application.

13. The device of claim 10, wherein to provide the option, the instructions are to cause the at least one hardware processor to:

display an interface comprising:
a first plurality of icons representing the first set of applications that the user has permission to access;
a second plurality of icons representing a second set of one or more applications that the user does not have permission to access;
wherein the interface indicates that (a) the first plurality of icons represents applications that the
user has permission to access and (b) the second plurality of icons represents applications that the user does not have permission to access.

14. The device of claim 10, wherein the instructions are to cause the at least one hardware processor to, responsive to the identification of the first set of applications that the user has permission to access, install the first set of applications on a device executing the particular user application.

15. The device of claim 10, wherein the instructions are to cause the at least one hardware processor to:

subsequent to causing execution of the first application, determine a change in permissions associated with the user;

identify, by the particular user application, that the user does not have permission to access the first application based on the change in permissions associated with the user; and prevent, by the particular user application, the user from accessing the first application.

16. The device of claim 10, wherein the instructions are to cause the at least one hardware processor to:

inject the policy enforcer code into a dynamic load library of the first application during a binary instrumentation of the first application.

17. A method comprising:

identifying, by a particular user application, a first set of applications that a user has permission to access, the first set of applications being selected from a plurality of applications, and wherein each application of the first set of applications comprises a policy enforcer code that automatically applies one or more security policies to control behavior of the application;

providing, by the particular user application to a user, an option to select at least one application of the first set of applications;

receiving, by the particular user application from the user, a request to access a first application in the first set of applications;

causing, by the particular user application, the policy enforcer code in a first application in the first set of applications to intercept system calls and framework calls on the first application and replace symbols for the intercepted system calls in an in-memory symbol table with predefined symbols and the framework calls with predefined calls to enable the policy encoder code to control behavior of the first application; and causing, by the particular user application, execution of the first application following interception and modification of the system calls and framework calls on the first application.

* * * * *